US007660840B2

(12) United States Patent
Taunton

(10) Patent No.: US 7,660,840 B2
(45) Date of Patent: Feb. 9, 2010

(54) METHOD, SYSTEM, AND COMPUTER PROGRAM PRODUCT FOR EXECUTING SIMD INSTRUCTION FOR FLEXIBLE FFT BUTTERFLY

(75) Inventor: Mark Taunton, Landbeach (GB)

(73) Assignee: Broadcom Corporation, Irvine, CA (US)

( * ) Notice: Subject to any disclaimer, the term of this patent is extended or adjusted under 35 U.S.C. 154(b) by 662 days.

(21) Appl. No.: 10/952,169

(22) Filed: Sep. 29, 2004

(65) Prior Publication Data

US 2005/0071403 A1 Mar. 31, 2005

Related U.S. Application Data

(60) Provisional application No. 60/506,487, filed on Sep. 29, 2003, provisional application No. 60/506,732, filed on Sep. 30, 2003, provisional application No. 60/507,522, filed on Oct. 2, 2003, provisional application No. 60/506,355, filed on Sep. 29, 2003.

(51) Int. Cl.
G06F 17/14 (2006.01)
(52) U.S. Cl. ..................................... 708/409; 708/404
(58) Field of Classification Search ................ 708/409, 708/404
See application file for complete search history.

(56) References Cited

U.S. PATENT DOCUMENTS

| 4,769,779 | A | * | 9/1988 | Chang et al. ................. | 708/622 |
| 6,377,970 | B1 | | 4/2002 | Abdallah et al. | |
| 6,421,696 | B1 | * | 7/2002 | Horton ........................ | 708/404 |
| 7,197,095 | B1 | * | 3/2007 | Van Wechel et al. ........ | 375/350 |
| 7,197,525 | B2 | * | 3/2007 | Stein et al. .................. | 708/409 |
| 7,233,968 | B2 | | 6/2007 | Kang | |
| 7,315,878 | B2 | | 1/2008 | Han | |
| 2005/0071414 | A1 | | 3/2005 | Taunton | |
| 2005/0102341 | A1 | * | 5/2005 | Taunton ...................... | 708/404 |
| 2005/0102342 | A1 | * | 5/2005 | Greene ........................ | 708/409 |

OTHER PUBLICATIONS

Clarke, P. "Broadcom's Firepath combines RISC, DSP elements," 2 pages, printed from www.commsdesign.com/show/Article.jhtml?articleID=10808435, 2 pages (Jun. 13, 2001).
Wilson, S., Firepath™ Processor Architecture and Microarchitecture, 24 pages,f downloaded from www.hotchips.org/archives/hc14, (presented Aug. 20, 2002).
Proakis, J.G. and Manolakis, D.G., Digital Signal Processing: Principles, Algorithms, and Applications, Second Edition, Macmillan Publishing Company, pp. 684-760 (1992).
Hot Chips 14 Archives (2002) General Information, 5 pages, printed from http://www.hotchips.org/archives/hc14/, (2002).
BCM6410/6420 Product Brief, 2 pages, Broadcom Corporation (2003).

* cited by examiner

Primary Examiner—David H Malzahn
(74) Attorney, Agent, or Firm—Sterne, Kessler, Goldstein & Fox PLLC

(57) ABSTRACT

An FFT butterfly instruction based on single instruction multiple data ("SIMD") technique is executed to reduce the number of cycles for software to perform FFT butterfly operations. The FFT butterfly instruction can implement one or more instances of the FFT butterfly operation (e.g., non-SIMD, 2-way SIMD, 4-way SIMD, etc.), at once, each instance operating over a set of complex values. A control register or variant opcode controls the behavior of the FFT butterfly operation. The contents of the control register or the variant opcode can be altered to configure the butterfly behavior to suit specific circumstances. The FFT butterfly instruction can be used in the software on a processor in a chip-set implementing the central-office modem end of a DSL link. The FFT butterfly instruction can also be used in other contexts where an FFT function is performed (and/or where an FFT butterfly operation is used) including systems that do not implement DSL or DMT.

25 Claims, 12 Drawing Sheets

METHOD, SYSTEM, AND COMPUTER PROGRAM PRODUCT FOR EXECUTING SIMD INSTRUCTION FOR FLEXIBLE FFT BUTTERFLY

CROSS-REFERENCE TO RELATED APPLICATIONS

This application claims the benefit of U.S. Provisional Application No. 60/506,487, filed Sep. 29, 2003, by Taunton, entitled "SIMD Instruction for Flexible FFT Butterfly," incorporated herein by reference in its entirety.

This application also claims the benefit of U.S. Provisional Application No. 60/506,732, filed Sep. 30, 2003, by Taunton, entitled "SIMD Instruction for Real/Complex FFT Conversion," incorporated herein by reference in its entirety.

This application also claims the benefit of U.S. Provisional Application No. 60/507,522, filed Oct. 2, 2003, by Taunton et al., entitled "Processor Execution Unit for Complex Operations," incorporated herein by reference in its entirety.

This application also claims the benefit of U.S. Provisional Application No. 60/506,355, filed Sep. 29, 2003, by Taunton, entitled "SIMD Instruction for Complex Multiplication," incorporated herein by reference in its entirety.

The following United States utility patent application has a common assignee and contains some common disclosure:

"Methods for Performing Multiplication Operations on Operands Representing Complex Numbers," U.S. patent application Ser. No. 10/951,867, filed Sep. 29, 2004, by Mark Taunton, filed concurrently herewith, incorporated herein by reference.

COPYRIGHT NOTICE

A portion of the disclosure of this patent document contains material which is subject to copyright protection. The copyright owner has no objection of the facsimile reproduction by any one of the patent document or patent disclosure, as it appears in the Patent and Trademark Office patent files or records, but otherwise reserves all copyright rights whatsoever.

BACKGROUND OF THE INVENTION

1. Field of the Invention

The present invention is directed to a software implemented Fast Fourier Transform ("FFT") and, more particularly, to single instruction multiple data ("SIMD") techniques for performing FFT butterfly operations.

2. Related Art

The Fast Fourier Transform (FFT) is a well-known algorithm, commonly used to translate between two complementary representations of sets of discrete data. FFT is described by Proakis, J. G. & Manolakis, D. G. in *Digital Signal Processing*, New York, Maxwell Macmillan, 1992, Chapter 9, ISBN 0-02-946378, incorporated herein by reference. The FFT is commonly used in communications systems to convert between time and frequency domains, in both directions. For example, it is widely applied in the implementation of discrete multi-tone (DMT) modulation and de-modulation. An inverse FFT is used at a transmitter to convert the data values to be modulated (represented as complex amplitudes of distinct component frequencies) into a sequence of points in the time domain which will form the basis of an analog signal subsequently transmitted. At the receiver, the reverse process uses a forward FFT to recreate the frequency-domain version of the signal, which is then decoded to derive the communicated data values. The term FFT is used generically herein to refer to both forward and inverse versions of the FFT.

Single instruction multiple data (SIMD) describes a style of digital processor design in which a single instruction is issued to control the processing of multiple data values in parallel (all being processed in the same manner) such as may be held in the form of an array or arrays. The FFT generally operates on arrays of complex (two-component or two-dimensional) data, and therefore, is potentially suited for implementation on SIMD processors. In its "radix-2" formulation, the FFT is based on a primitive operation known as a "butterfly" (which derives its name from its shape in a graphical representation). An FFT butterfly operation takes as inputs two complex data values, combines them arithmetically with a third constant complex value (referred to as a twiddle factor), and produces two outputs that are also complex values. In a radix-2 FFT, the computation for an array of $N=2^S$ complex elements proceeds through a series of S stages, each of which involves N/2 butterfly operations. At each stage, complex values in the input array to that stage are combined in pairs by FFT butterfly operation to produce new values in an output array for that stage. The selection of which values in the input array are paired up to produce each pair of output values varies stage by stage in a regular way.

In older designs for transmission systems using DMT (such as a digital subscriber line (DSL) modem) which are in general more hardware oriented, the FFT function used in both transmitters and receivers is typically performed by fixed-function logic circuits. However, such system designs are harder to adapt for varying application requirements. For example, different versions of DSL use different numbers of frequencies and consequently different numbers of points in the time-domain, to be handled by the inverse and forward FFT functions. While it is possible to design hardware circuits to cope with this variability, it is more complex and hence more expensive to implement. In order to increase flexibility in modem development and application, it has become more common to use software to perform the various functions in a DMT-based transmitter, receiver, or modem, especially in the case where one processor handles the operations for multiple independent channels (e.g., in a multi-line DSL modem in the central office). With increasing pressure for greater integration and performance, and therefore more channels to be handled per processor and/or larger sized FFT operations, it becomes necessary to improve the efficiency of FFT processing in such software-based DMT devices.

Software-based FFT computations are computationally expensive. For example, in an existing 2-way long instruction word (LIW) SMID processor used in an asymmetric digital subscriber line (ADSL) modem, inverse FFT routines apply regular DSP-style instructions, in particular the "Multiply-Accumulate" (MAC) instruction used in SIMD format, to implement FFT butterfly operations. For data represented at 16-bits precision for each component of the complex data format, the core butterfly step requires ten SIMD arithmetic instructions, represented in five instruction words (using the 2-way LIW characteristic of the processor) and taking five cycles to be issued, for every four butterfly operations performed. For a "256-tone" inverse FFT (i.e., S=8, thus $N=2^8=256$), the full complex inverse FFT function requires around 1,600 cycles. The equivalent code for the case of 512 tones (distinct frequencies) would require around 3,600 cycles on the same processor, because the computational cost of the FFT (number of arithmetic operations performed, in general proportional to the number of butterfly operations performed) is generally proportional to $N \log_2 N$.

An FFT computation, based on the radix-2 butterfly operation, can therefore represent a significant proportion of the total computational cost for a software-based DMT transmitter, receiver or modem, especially in the case where one processor handles the operations for multiple independent channels (e.g., in a multi-line DSL modem in a central office). With increasing pressure for greater integration and performance, and therefore more channels to be handled per processor and/or larger-sized FFT computations, it becomes necessary to improve the efficiency of FFT processing in such software-based DMT devices.

What are needed, therefore, are more efficient methods and systems for performing FFT computations.

SUMMARY OF THE INVENTION

The present invention is directed to methods, systems, and computer program products for performing FFT butterfly operations. In an embodiment, the present invention includes an FFT butterfly instruction based on Single Instruction Multiple Data ("SIMD") techniques. The FFT butterfly instruction reduces the number of cycles needed for software to perform FFT computations using FFT butterfly operations.

In an embodiment, one instance of an FFT butterfly operation is performed on one instance of a set of complex values. In another embodiment, the FFT butterfly instruction implements in parallel two instances of the FFT butterfly operation, i.e., 2-way SIMD, over two instances of a set of complex values at once. In other embodiments, 4-way SIMD, 8-way SIMD, or the like are implemented with a corresponding quantity of instances of the FFT butterfly operation.

The exact behavior of the FFT butterfly instruction is controlled either by means of a separate control register, by means of a variant opcode, or by a combination of the two means. The contents of the control register may be altered by the programmer, or a different opcode can be selected, to configure the butterfly behavior to suit specific circumstances. In an embodiment, the control register and/or variant opcode specifies four operation parameters that are implemented to manage the precise behavior of the FFT butterfly instruction. The operation parameters include scaling, replication, conjugation, and interleaving. In an embodiment, the control register includes four control bits, one for specifying each operation parameter.

In an example implementation, the FFT butterfly instruction is used in the software on a processor in a chip-set implementing the central-office modem end of a digital subscriber line (DSL) link. The FFT butterfly instruction can also be used in other contexts where an FFT function is to be performed (and/or where an FFT butterfly operation is used) including systems that do not implement DSL or discrete multi-tone (DMT) modulation and de-modulation.

Additional features and advantages of the invention will be set forth in the description that follows. Yet further features and advantages will be apparent to a person skilled in the relevant art(s) based on the description set forth herein or may be learned by practice of the invention. The advantages of the invention will be realized and attained by the structure particularly pointed out in the written description and claims hereof as well as the appended drawings.

It is to be understood that both the foregoing summary and the following detailed description are exemplary and explanatory and are intended to provide further explanation of the invention as claimed.

BRIEF DESCRIPTION OF THE DRAWINGS/FIGURES

The present invention will be described with reference to the accompanying drawings.

DETAILED DESCRIPTION OF THE INVENTION

The Fast Fourier Transform (FFT) butterfly instruction of the present invention reduces the number of cycles needed to perform an inverse and/or forward FFT computation, using a single instruction multiple data (SIMD) technique. In an embodiment, the FFT butterfly instruction, when executed as part of an FFT computation, performs (part of) a conversion between the time domain and the frequency domain (in either direction) within a digital signal processing environment. For example, the inverse FFT computation, implemented by executing a number of FFT butterfly instructions, is performed at a transmitter to convert data values to be modulated (represented as complex amplitudes of distinct component frequencies) into a sequence of points in the time domain, which will form the basis of an analog signal subsequently transmitted. At a receiver, a reverse process uses the forward FFT computation, implemented by executing a number of FFT butterfly instructions, to recreate the frequency-domain version of the signal, which is then further processed to derive the communicated data values.

In an embodiment, the FFT butterfly instruction mechanism is implemented in the processor(s), and executed by means of software running on the processor(s), of a chip or chip-set implementing one or more instances of a DSL (digital subscriber line) modem. Examples of such modems include but are not limited to: an ATU-C (Asymmetric Digital Subscriber Line (ADSL) Termination Unit at a Central-Office); an ATU-R (ADSL termination unit-Remote end)—also known as an ADSL customer premise equipment (CPE) modem; a VTU-O (Very high speed digital subscriber line (VDSL) Termination Unit-Optical network unit); and a VTU-R (VDSL Termination Unit-Remote site). In each case, the modem would be connected at one end of a telephone line carrying digital signals, i.e., a DSL link. In other embodiments, the FFT butterfly instruction is implemented in a processor, and executed by software running on the processor, in which software performs the FFT computation (or in which the FFT butterfly operation is used), including systems not implementing DSL or discrete multi-tone (DMT) modulation and de-modulation.

Figure 1:
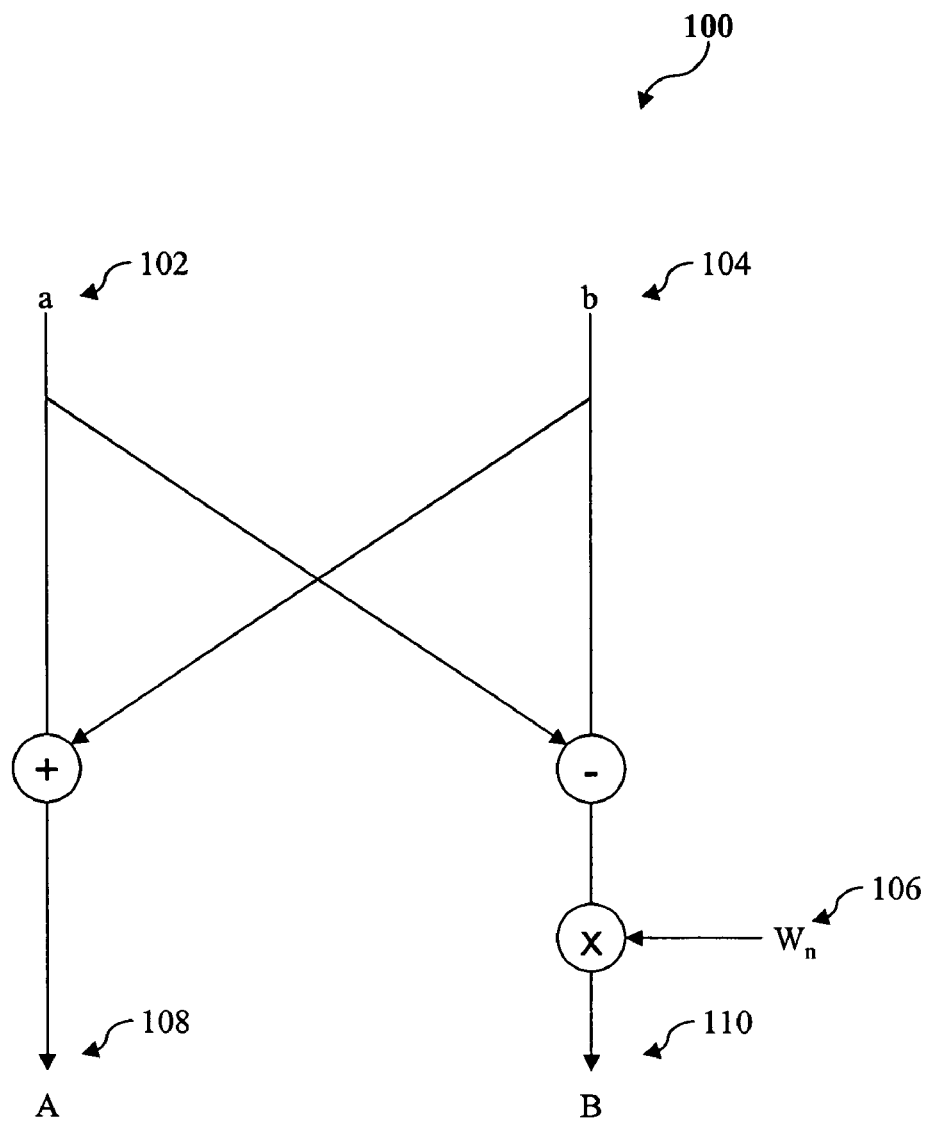
FIG. 1 is a logical representation of the form of an FFT butterfly operation.

FIG. 1 illustrates a logical representation of an FFT butterfly operation 100 that translates between two complementary representations of sets of discrete data. Although the present invention is described with reference to performing FFT butterfly operation 100 on arrays of complex (2-component) data, the FFT computation supported by the present invention can also be implemented to operate on arrays of purely real-valued (single-dimensional) data points as inputs or outputs.

In a radix-2 formulation, FFT butterfly operation 100 takes input values 102 and 104, which represent two complex data values a and b, respectively. FFT butterfly operation 100, thereafter, combines input values 102 and 104 arithmetically with an input value $W_n$, (shown as 106), and produces two output values 108 and 110, which represent two complex values A and B, respectively. In an embodiment, the complex values A and B are computed by the following Equation:

$$A = a+b$$
$$B = (a-b) \times W_n \quad \text{Equation 1}$$

In Equation 1, all operations (+, −, ×) are of complex type, i.e., complex addition, complex subtraction, and complex multiplication, respectively. In a radix-2 FFT, the computation for an array of $N=2^S$ elements proceeds through a series of S stages, each of which involves N/2 butterfly operations. At each stage, complex values 102 and 104 in the input array to that stage are combined by butterfly to produce values (108 and 110) in an output array for that stage. The selection of which values (102 and 104) in the input array are paired up to produce each pair of output values (108 and 110) varies stage by stage.

The complex input value $W_n$ is herein also referred to as a twiddle factor 106. The n subscript relates to the location of a specific FFT butterfly operation 100 within the array of such operations applied in each FFT stage—different locations in general use different values of $W_n$ (twiddle factor 106). In a given location, the value of $W_n$ is constant (does not change from one instance of the FFT computation to another), whereas the input values 102 and 104 are in the general case variable. In an embodiment, every twiddle factor 106 is constrained to have a scalar magnitude (complex norm) of one, but the different values of twiddle factor 106 have different phase angles. Each twiddle factor 106 can, therefore, be represented in the form cos α+j sin α, for some angle α. For an FFT butterfly of size N, the values of α are all multiples of 2π/N.

As discussed, the value of twiddle factor 106 varies between the different instances of FFT butterfly operation 100 within each stage and from stage to stage within the overall FFT butterfly operation 100. However, different stages have different numbers of distinct values of twiddle factor 106. In a decimation-in-frequency structure for FFT butterfly operation 100, the number of distinct values of twiddle factor 106 at each stage reduces by a factor two from the preceding stage. The same number (N/2) of FFT butterfly operations 100 are always performed at each stage, but each distinct $W_n$ value (twiddle factor 106) occurring in a given stage is used $2^m$ times, where m is the number of the stage (numbering the stages from 0 through S-1). Therefore, in the final stage (S-1) only one value of $W_n$ (twiddle factor 106) occurs—used for all $2^{S-1}=N/2$ FFT butterfly operations 100 in that stage; the value of $W_n$ for that stage is 1+j0, more simply expressed as 1. (As an optimization, in this stage, the complex multiplication part of the FFT butterfly (i.e., the calculation of the complex product of (a−b) and $W_n$) can therefore be omitted and B calculated as just (a−b).)

Figure 2:
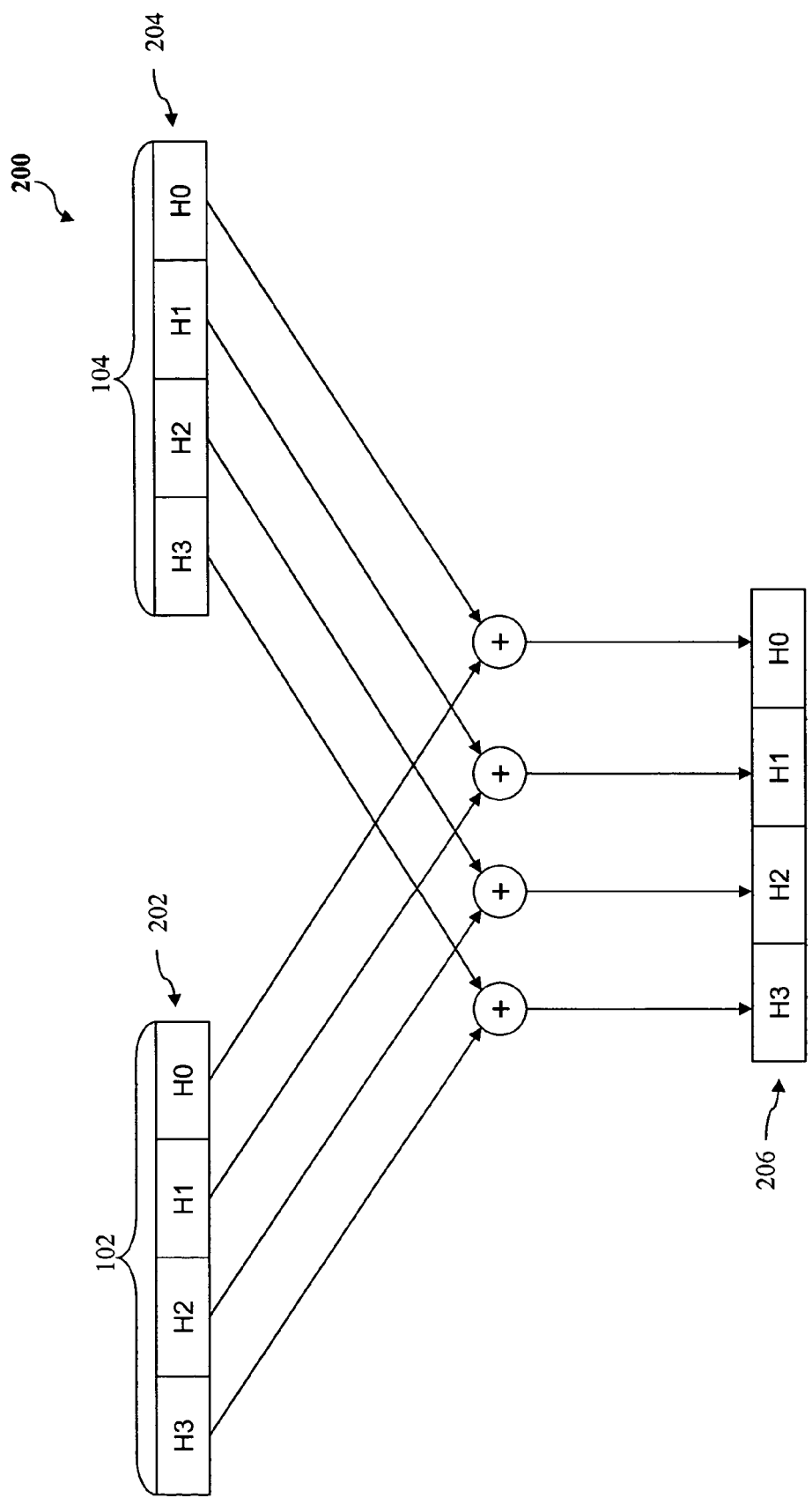
FIG. 2 is a logical representation of a four-way SIMD implemented addition of halfword data values.

Single Instruction Multiple Data (SIMD) is a technique for increasing the effectiveness of processing in a digital processor. A SIMD digital processor can execute a single instruction to control the processing of multiple data values in parallel. To illustrate SIMD working with respect to FIG. 2, consider the following instruction that is executable on the FirePath™ digital processor produced by Broadcom Corporation (Irvine, Calif.):

ADDH c, a, b

The instruction mnemonic ADDH is an abbreviation for "ADD Halfwords", where a halfword is the term used for a 16-bit quantity on the FirePath™ processor. The instruction "ADDH c, a, b" takes as input two 64-bit operands 202 (i.e., "a" in the instruction) and 204 (i.e., "b" in the instruction), and writes the results back to a 64-bit operand 206 (i.e., "c" in the instruction). ADDH performs four 16-bit (halfword) additions: the value in each 16-bit lane (shown as H3, H2, H1, and H0) in input register 202 is added to the corresponding value in each 16-bit lane (shown as H3, H2, H1, and H0) in 204 to produce four 16-bit results (shown as H3, H2, H1, and H0) in output register 206, which is a 64-bit register.

The above-described SIMD method can be applied to many types of operations, and allows for a great increase in computational power compared with earlier types of processors where an instruction can only operate on a single set of input data values (e.g., one 16-bit operand from input register 202, one 16-bit operand from input register 204, giving one 16-bit result in output register 206). For situations—common in digital signal processing applications—where the same operation is to be performed repeatedly across an array of values, the above-described SIMD method allows a significant speed-up. In the above example, the speed-up is by a factor of four in the basic processing rate, since four add operations can be performed at once rather than only one.

Figure 6:
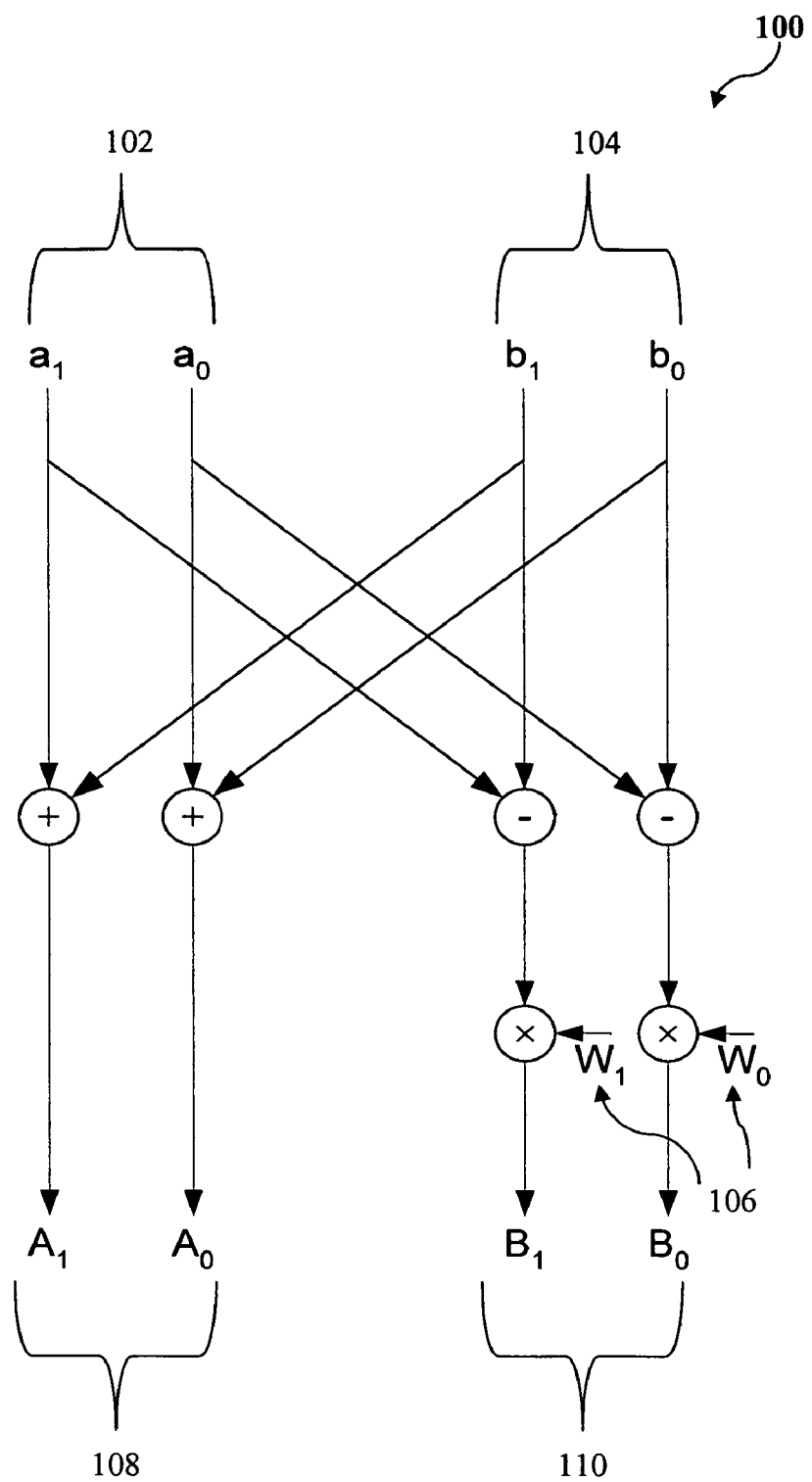
FIG. 6 illustrates a logical representation of the form of a two-way SIMD FFT butterfly operation.

In an embodiment of the present invention, a processor performs one instance of FFT butterfly operation 100 at a time, taking as inputs one complex number a as input value 102, one complex number b as input value 104, and one complex number Wn as twiddle factor 106. In another embodiment of the present invention, a SIMD processor performs multiple instances of FFT butterfly operation 100 to process multiple input values 102 and 104 along parallel pipelines. Such pipelines may be combined into one execution unit of the processor, or may be implemented separately in separate execution units. This can be explained with reference to FIG. 6. FIG. 6 illustrates the form of a two-way SIMD version of FFT butterfly operation 100, which shows two instances of an input value (i.e., two instances of a complex number) for each of input a 102 and input b 104. Input a 102 includes a0 and a1, each representing a complex (two-dimensional) value. Similarly, input b 104 includes b0 and b1, each representing a complex (two-dimensional) value. The multiple input values 102 and 104 are combined arithmetically with two complex twiddle factor values W0 and W1 of twiddle factor 106. The resulting outputs are two complex values for each of outputs 108 and 110. Output value 108 includes A0 and A1, and output value 110 includes B0 and B1.

The FFT butterfly instruction for performing FFT butterfly operation 100 can be executed in multiple pipelines on a SIMD microprocessor, such as the FirePath™ processor used in the BCM6411 and BCM6510 devices produced by Broadcom Corporation (Irvine, Calif.). One or more examples of an execution unit for a SIMD microprocessor that is useful for implementing the present invention are described in the application entitled "Processor Execution Unit for Complex Operations" (U.S. Patent App. Ser. No. 60/507,522), which is incorporated herein by reference as though set forth in its entirety; and/or in the application entitled "Data De-Scrambler" (U.S. Patent App. Ser. No. 60/505,859), which is incorporated herein by reference as though set forth in its entirety.

Figure 3A:
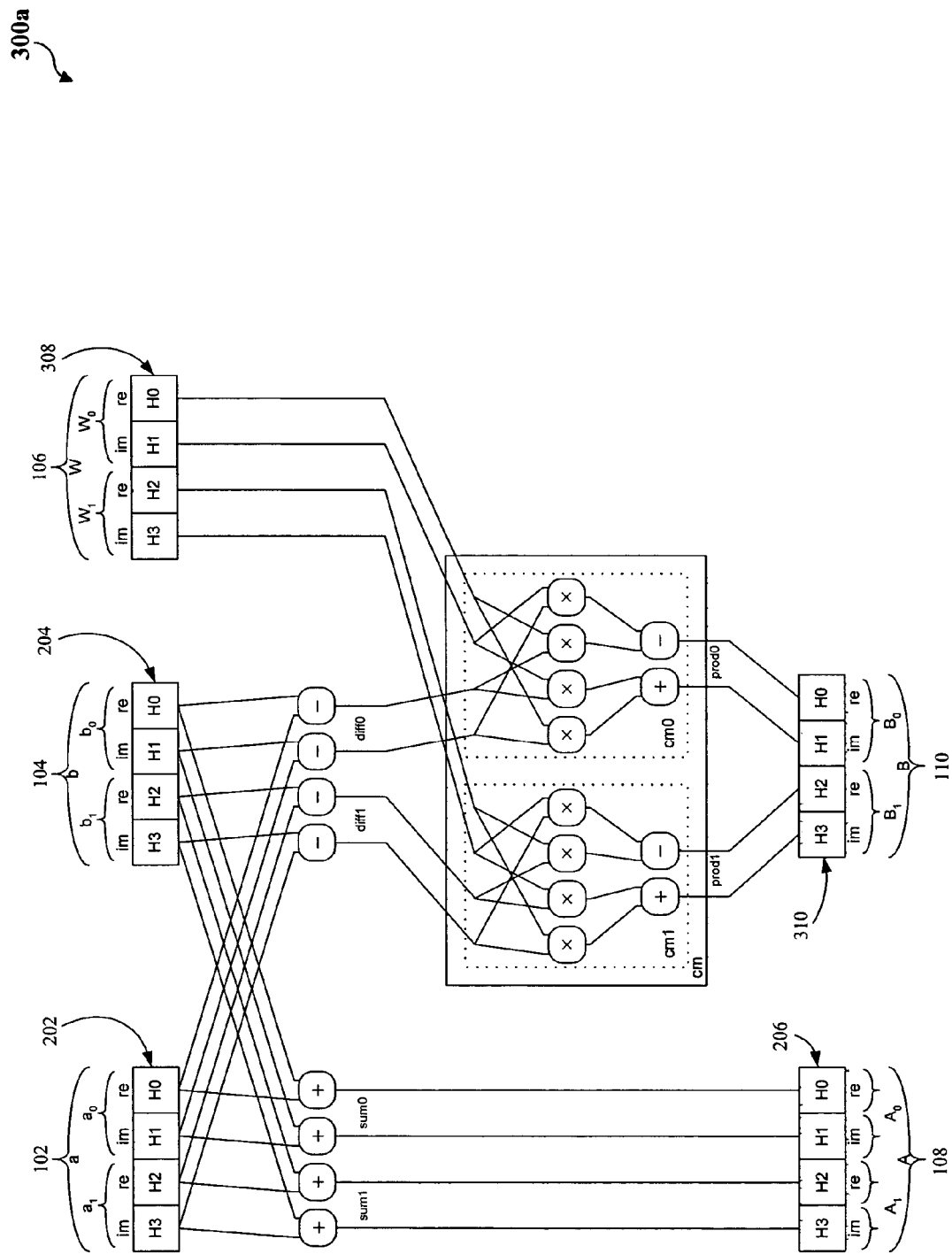
FIG. 3a is a logical representation of a two-way SIMD FFT butterfly operation.

FIG. 3a illustrates a logical representation of a two-way SIMD FFT butterfly operation utilizing halfword data values. As shown, an arithmetic operation 300a is performed on multiple input data values 102, 104, and 106 from three input registers or operands 202, 204, and 308, respectively. The results (i.e., output data values 108 and 110) of the arithmetic operation 300a are written to two output registers or operands 206 and 310. In an embodiment, input data values 102, 104, and 106 are 64 bits each (where a 64-bit unit is also known as a longword), and are capable of being logically subdivided into and treated as multiple smaller values (e.g., 8×8-bit (byte) values, 4×16-bit (halfword) values, or 2×32-bit (word) values). In FIG. 3a, input data values 102, 104, and 106 are in one aspect logically subdivided into four 16-bit values or "halfwords" (shown as H3, H2, H1, and H0 for both 102, 104, and 106). In other embodiments, other widths of values may be used, either larger or smaller. Although the use of sizes of values and subdivisions of values that are powers of two (e.g., 64 bits, 32 bits, 16 bits, etc.) is common, this is only by way of example, and the principles of the present invention are equally applicable to other sizes of values. In the context of SIMD methods, the smaller-sized units (e.g., H3, H2, H1, and H0) within the larger width data path are often referred to as "lanes".

The 64-bit input operand 202 can from another aspect be considered to be comprised of two 32-bit fields a0 and a1, each representing a complex (two-dimensional) value. Likewise, input operand 204 is comprised of two 32-bit fields b0 and b1, and input operand 308 is comprised of two 32-bit fields W0 and W1. Thus, FFT butterfly operation 300a can therefore be considered as 2-way SIMD on 32-bit complex values. Each 32-bit complex field is further comprised of a 16-bit real scalar part (re) and a 16-bit imaginary scalar part (im). Because the individual items on which scalar arithmetic operations are performed are each 16 bits wide (i.e., halfword), the four 16-bit elements in each 64-bit operand (i.e., 202, 204, 206, 308, and 310) are labeled as H3, H2, H1, and H0 (i.e., halfword 3, halfword 2, etc.), where H3 is the most significant 16-bit lane and H0 is the least significant 16-bit lane.

As used herein (specifically with reference to FIGS. 2, 3a-3f, and 5), the order of the halfwords is shown as H3 as the most significant (left-most) part of the larger value, with H2, H1 and H0 in less significant positions (further to the right). This ordering corresponds to "little-endian" ordering, where the least significant unit in a linear sequence of units is numbered with the lowest number or address. In an alternative embodiment of the present invention, the most significant part of the value could be the lowest-numbered or lowest-addressed part, and the least significant part the highest-numbered or highest-addressed part using so-called "big-endian" ordering. The principles of the present invention apply equally to that ordering also. It will also be apparent that in the same manner, the ordering of the two 32-bit complex parts within a 64-bit value can equally be implemented using either "little-endian" or "big-endian" arrangements. Also, whereas the real and imaginary parts of each complex value are shown in a certain order in the Figures herein (i.e., real part as less-significant part, imaginary part as more-significant part), other orders can be used as well (e.g., real part as more significant part, imaginary part as less significant part), without departing from the principles of the present invention.

Each 64-bit output operand 206 and 310 is comprised in the same way as the input operands 202, 204, and 308. The same possible variations of implementation with regard to the numbering and ordering of the parts of the various input values to the operation (such as "little-endian" or "big-endian" modes, ordering of real part and imaginary part) apply equally in respect of the output operands. In an embodiment it would be reasonable, but not necessarily required, to use the same ordering of the parts of the output operands as is used for the input operands.

At the left of FIG. 3a, a 4-way SIMD 16-bit addition block adds each 16-bit scalar element of 102 to the corresponding element of 104 to give a sum, and the sum is supplied as the result 108, i.e., sum=Input 102+Input 104

Output 108=sum where "+" means SIMD complex addition, and the first line, performing the summing operation, is equivalent to:

sum0=a0+b0 sum1=a1+b1 treating each complex value separately, and "+" meaning complex addition; this in turn is the same as saying:

sum0.re=a0.re+b0.re sum0.im=a0.im+b1.im sum1.re=a1.re+b1.re sum1.im=a1.im+b1.im where "+" means scalar addition and the suffices ".re" and ".im" identify the respective real and imaginary parts of the complex operands.

In parallel with the above SIMD addition, a 4-way SIMD 16-bit subtraction block similarly computes:

diff=Input 102−Input 104 where "−" means SIMD subtraction and "diff" is a 64-bit internal value. As described above for "sum", "diff" represents two 32-bit complex values "diff0" and "diff1", each with a 16-bit real part (e.g., diff1.re) and a 16-bit imaginary part (e.g., diff0.im).

The "diff" value is passed to a 2-way SIMD complex multiplication block (labeled "cm" in FIG. 3a), where a 2-way SIMD complex multiplication is performed:

prod0=diff×W where "x" denotes SIMD complex multiplication, not scalar multiplication. This SIMD complex multiplication is implemented by performing an individual complex multiplication operation in each of two sub-blocks labeled "cm0" and "cm1" in FIG. 3a:

prod0=diff0×W0 prod1=diff1×W1 where "x" means complex multiplication, "prod0" is the output of "cm0" (i.e., the complex product of diff0 and W0), and "prod1" is the output of "cm1" (i.e., the complex product of diff1 and W1). The internal structure of each complex multiplication block "cm0" and "cm1" is also shown in FIG. 3a. In an embodiment, the complex multiplication is performed as described in U.S. Provisional Application No. 60/506,355, filed Sep. 29, 2003, by Taunton, entitled "SIMD Instruction for Complex Multiplication," incorporated herein by reference in its entirety.

The output values "prod0" and "prod1" from the 2-way SIMD complex multiplication form the result 110, the SIMD operand B, comprised of B0 and B1. B includes B0, comprised of the real and imaginary parts of "prod0" from "cm0", as its H0 and H1 parts, respectively; B also includes B1, comprised of the real and imaginary parts of "prod1" from "cm1", as its H2 and H3 parts, respectively.

The FFT butterfly instruction of the present invention reduces the number of cycles needed for software to perform an FFT computation. As described in greater detail below, the SIMD FFT butterfly instruction processes a plurality of instances of an FFT butterfly operation (e.g., 2-way SIMD, 4-way SIMD, 8-way SIMD, etc.) at once, each instance operating over a set of complex values.

In an embodiment, control of the exact behavior of the FFT butterfly instruction is by means of a control register. To configure the butterfly behavior to suit specific circumstances, the contents of the control register can be altered by the programmer. The execution logic of the processor unit that implements the FFT butterfly operation determines its exact behavior by using control values read from the control register.

In another embodiment, the exact behavior of the FFT butterfly instruction is controlled by variant opcode. The programmer selects the required behavior for a given instance of the FFT butterfly instruction, by choosing which of a number of possible different opcodes is used in that instance. The possible opcodes that are available to choose between all identify an FFT butterfly instruction in respect to overall effect, but with variations in exact behavior. The instruction decoding and execution logic of the processor then implements the behavior specified for that variant in accordance with which opcode was used to initiate execution of the FFT butterfly operation.

In another embodiment, a combination of a control register and variant opcodes yield flexibility and efficiency. Some behavioral options are less likely to change quickly through the execution of an FFT computation, for example whether the FFT butterfly operation is part of a forward FFT or an inverse FFT—this is generally constant for any one FFT computation. Options of that nature can therefore most conveniently be selected by a setting of the control register, which can be performed once at the outset of the overall computation and left unchanged for the duration of that computation (which may require a large number of FFT butterfly instructions to be executed). Other options, such as whether a gain adjustment is required for a given FFT butterfly operation, may be changed with greater frequency as required by the programmer, and for such options it may be more convenient to use variant opcodes. For example, to execute a sequence of FFT butterfly instructions having different gain adjustments for different instructions in the sequence, it is more efficient to use variant opcodes for each variation in gain, rather than to have to perform an extra operation to write a new value to the control register for every change of gain.

Figure 4A:
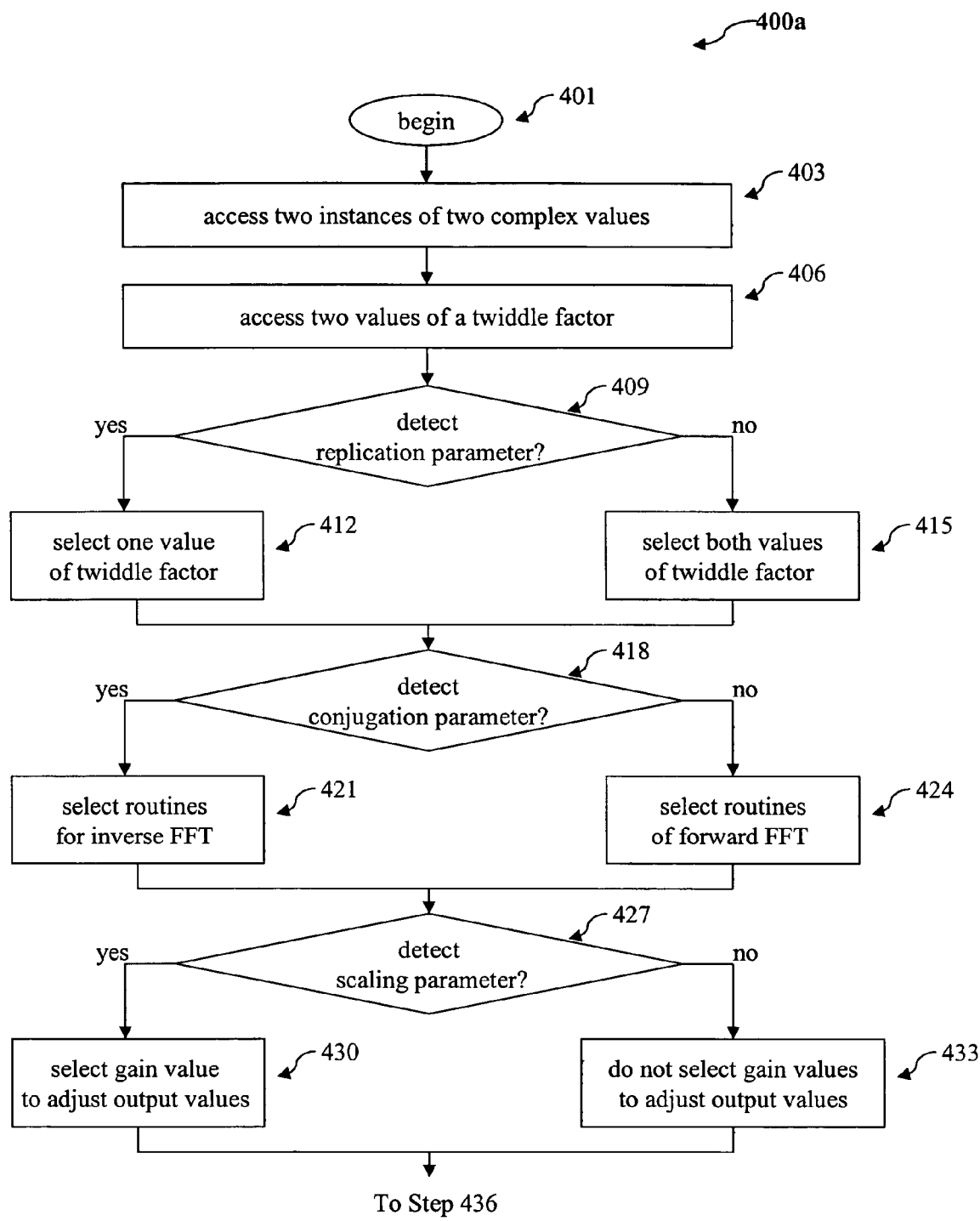
FIGS. 4a-4b illustrate an operational flow for executing a SIMD FFT butterfly instruction according to an embodiment of the present invention.
Figure 4B:
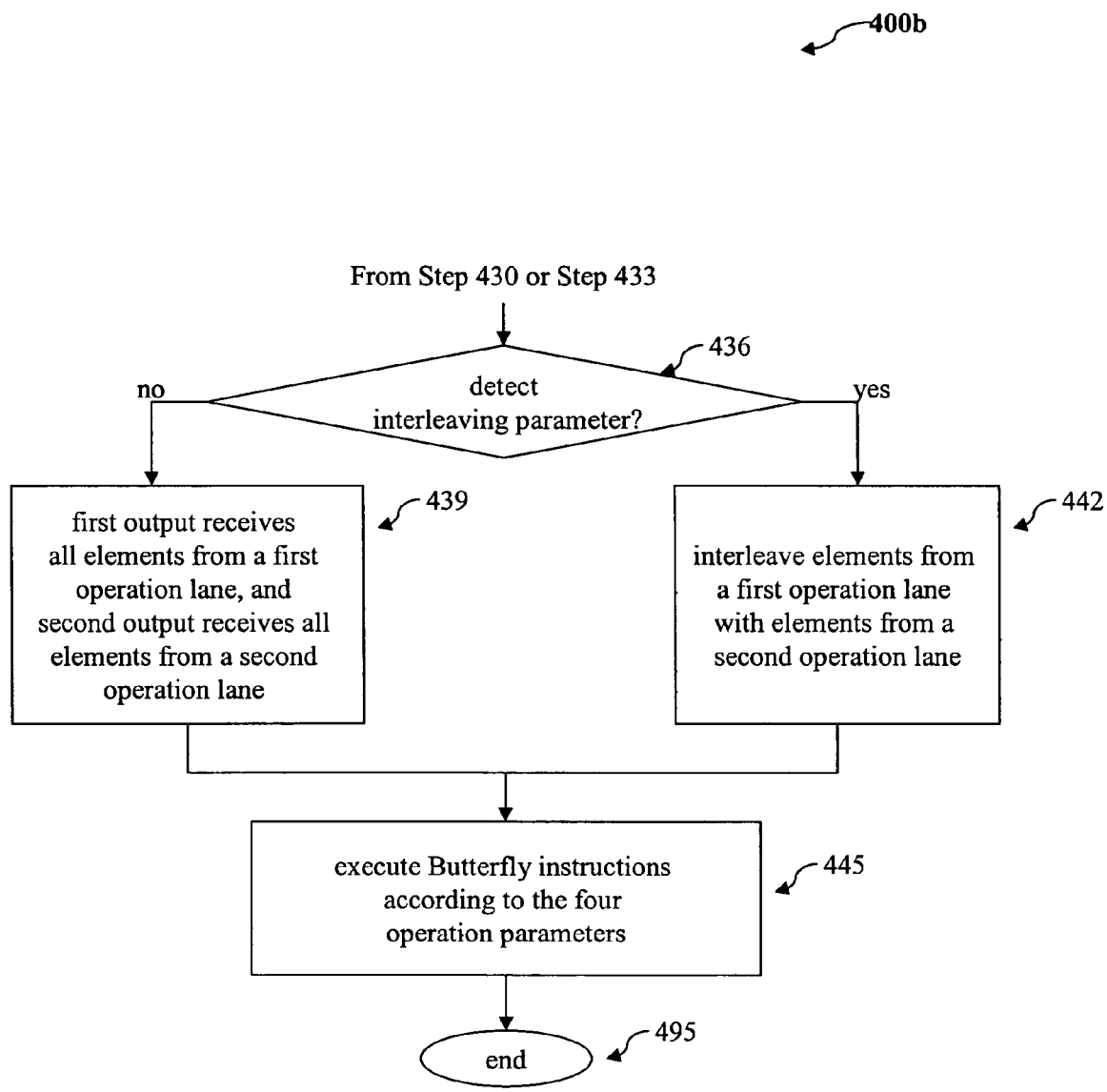

Referring to FIGS. 4a-4b, flowcharts 400a-400b (referred to collectively herein as flowchart 400) represent the general operational flow of an embodiment of the present invention. More specifically, flowchart 400 shows an example of a control flow for executing a 2-way SIMD FFT butterfly instruction.

The control flow of flowchart 400 begins at step 401 and passes immediately to step 403. At step 403, two instances of a complex point for each of two inputs are accessed. As such, two instances of the FFT butterfly operation, i.e., 2-way SIMD, are initiated at once, each instance for two complex points.

Referring back to FIG. 3a, two 64-bit input data values (102 and 104) are accessed via input operand 202 and input operand 204. Input operand 202 contains two complex values a0 and a1. Complex value a0 is represented by a pair of 16-bit values (shown as real value a0.re in the H0 lane, and imaginary value a0.im in the H1 lane), which correspond to a first instance of input operand 202 of the butterfly. Complex value a1 is represented by a pair of 16-bit values (shown as real value a1.re in the H2 lane, and imaginary value a1.im in the H3 lane), which correspond to a second instance of input operand 202 of the butterfly.

The second input operand 204, likewise, contains two complex values b0 (shown as b0.re in H0 and b0.im in H1) and b1 (shown as b1.re in H2 and b1.im in H3). Complex value b0 corresponds to a first instance of input operand 204 of the butterfly. Complex value b1 corresponds to a second instance of input operand 204 of the butterfly.

At step 406 in FIG. 4a, two values of a twiddle factor (such as twiddle factor 106 in FIG. 1) are accessed for the FFT butterfly operation. A third input operand (shown as twiddle factor operand 308 in FIG. 3a) contains two values of twiddle factor 106 (shown as W0 and W1 in FIG. 3a), which correspond to two instances of twiddle factor operand 308. The size of twiddle factor operand 308 is 64 bits. Complex value W0 is logically subdivided into a pair of 16-bit values (having a real part W1.re in H0 and an imaginary part W1.im in H1), which correspond to a first instance of twiddle factor operand 308. Complex value W1 is logically subdivided into a pair of 16-bit values (having a real part W1.re in H2 and an imaginary part W1.im in H3), which correspond to a second instance of twiddle factor operand 308.

As discussed above, control of the exact behavior of the FFT butterfly instruction is by means of a separate control register, a variant opcode, or a combination of the two mechanisms. The contents of the control register can be altered by the programmer, or a different opcode can be selected, to configure the butterfly behavior to suit specific circumstances. At steps 409-442, four operation parameters are specified and implemented to manage the precise behavior of the FFT butterfly instruction. The operation parameters include scaling, replication, conjugation, and interleaving. In an embodiment, the control register includes four control bits, one for specifying each operation parameter. In another embodiment, up to sixteen variant opcodes are provided in the processor instruction set, from which the programmer can choose one giving the required combination of the four parameter settings for each separate instance of the FFT butterfly instruction in the software program. In another embodiment, some parameters are chosen by means of setting a control register, and some parameters are chosen by use of variant opcodes. A further embodiment provides a number (N) of variant opcodes to choose a set of parameter settings by determining from the particular opcode used, which one of N distinct control registers is to act as the control register for an individual instance of the FFT butterfly instruction. Each of the N control registers contains settings for the parameters, and can be separately accessible to the programmer to allow definition of the various required combinations of parameters, as in an embodiment in which there is only one control register. If the number of distinct combinations of the various parameter settings, as may be required for a particular FFT computation, is less than the total possible number of combinations (16, in the case of 4 parameters), such an embodiment allows a reduction in the number of variant opcodes that are required to be decoded and interpreted by the processor's instruction decoding unit and/or execution units, at cost of an increased number of control registers to be supported.

Figure 3B:
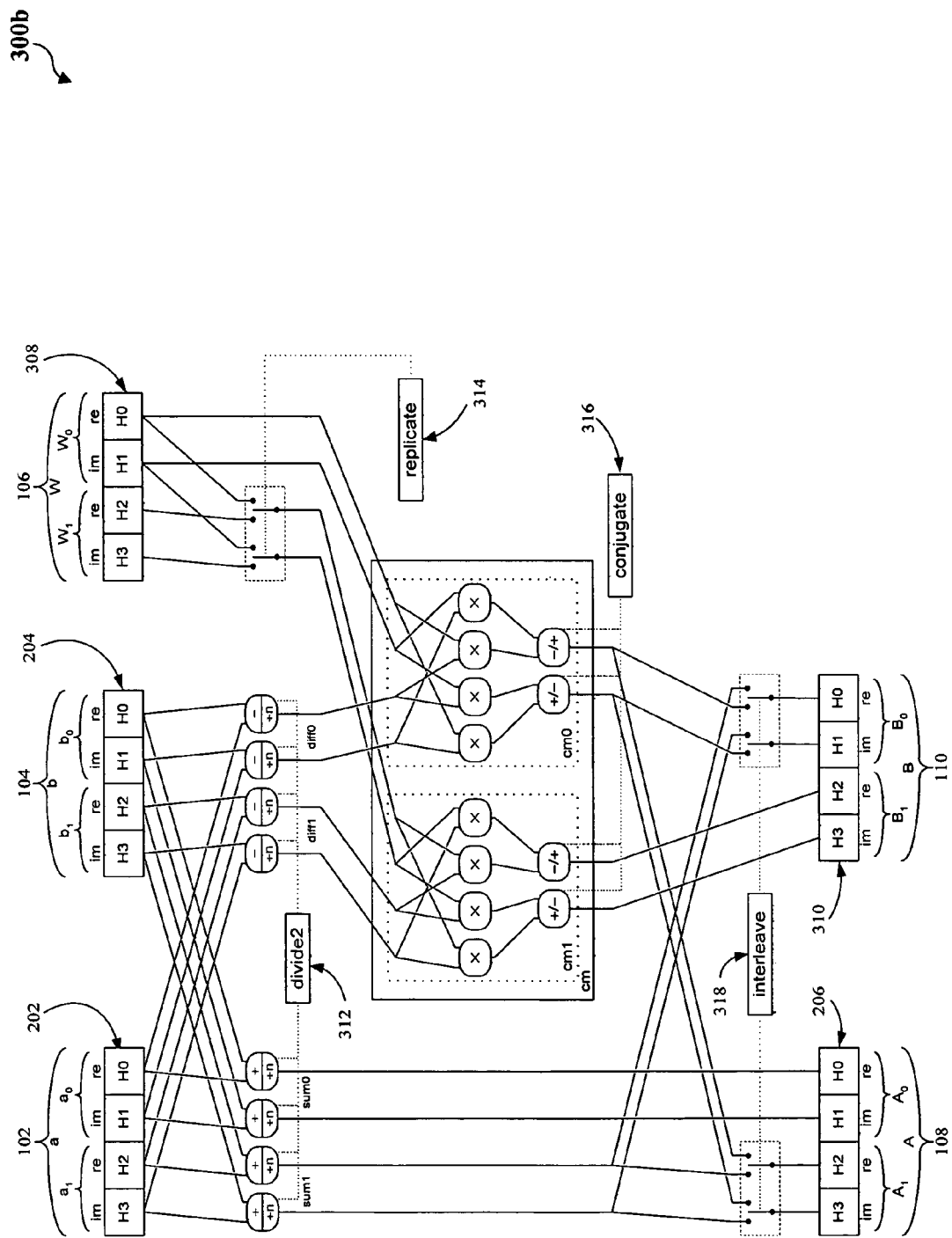
FIG. 3b is a logical representation of a two-way SIMD FFT butterfly operation with mode controls for operation parameters.

FIG. 3b shows another embodiment of a two-way SIMD implemented FFT butterfly operation. The behavior of arithmetic operation 300b, shown in FIG. 3b, is controlled by four operation parameters: scaling parameter 312, replication parameter 314, conjugation parameter 316, and interleaving parameter 318. When activated, the four operation parameters (i.e., 312, 314, 316, and 318) manage scaling, replication, conjugation and interleaving within arithmetic operation 300b, as described in greater detail below.

Referring back to FIG. 4a at step 409, a replication parameter 314 is detected from a control bit, variant opcode, or the like. As discussed above, two instances (W0 and W1), of twiddle factor operand 308 are accessed at step 406. At step 409, the replication parameter 314 determines which of the two instances are used during the FFT butterfly operation 300b.

In an embodiment using a control register (or one of a set of control registers) to determine the replication parameter 314, if a replication control bit has been set to a first state, then the replication parameter 314 is considered as active. If the replication control bit has been set to a second state (the complement of the first state), then the replication parameter 314 is considered as inactive. For example, the first state could be logic level 1 (logical "TRUE") and the second state would then be logic level 0 (logical "FALSE").

If the replication parameter 314 is active at step 409, the control flow passes to step 412, and the W0 value is selected from the twiddle factor operand 308 for both lanes of the SIMD operation. As such, the first lane in the 2-way SIMD FFT butterfly operation 300a would use the input values (a0, b0, W0), and the second lane would use the input values (a1, b1, W0).

If the replication parameter 314 is inactive at step 409, the control flow passes to step 415, and the W0 and W1 lanes are applied separately to each lane of the SIMD operation. In other words, the first lane in the FFT butterfly operation 300a would use the input values (a0, b0, W0), and the second lane would use the input values (a1, b1, W1).

Figure 3C:
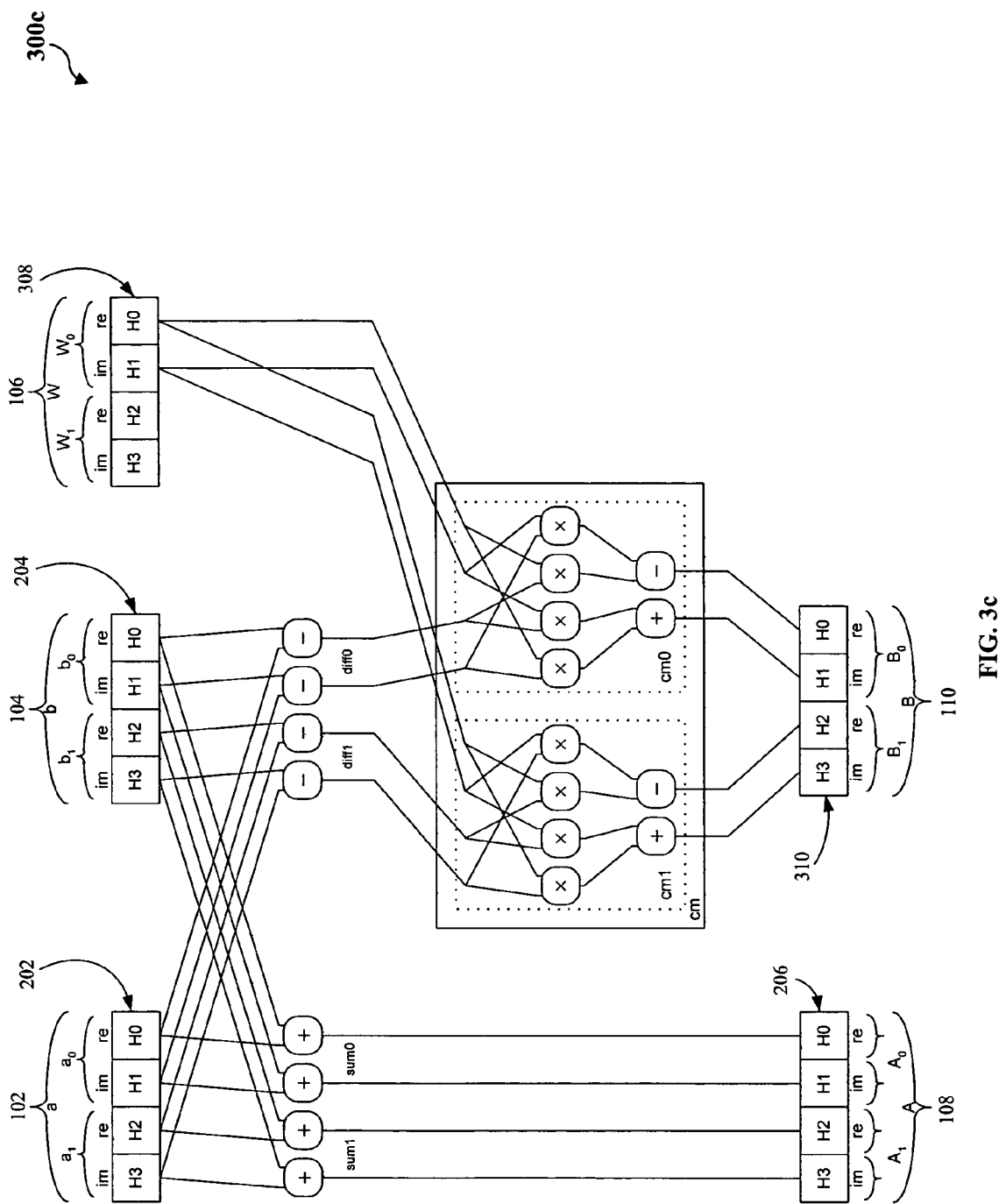
FIG. 3c is a logical representation of a two-way SIMD FFT butterfly operation with replication.

The activation of replication parameter 314 can be explained with reference to FIG. 3c, which shows another embodiment of a two-way SIMD implemented FFT butterfly operation. The arithmetic operation 300c is shown in FIG. 3c in replication mode. As such, the W0 value is selected from the twiddle factor operand 308 for both lanes of the SIMD operation.

Being able to alter the replication parameter 314 is beneficial in that in the FFT butterfly stages beyond the first stage (i.e., stage 0), the same twiddle factor value is used for at least two butterfly operations in each stage. A particular 64-bit operand used in stage 0, containing two distinct twiddle factor values, can be re-used in later stages (e.g., stage 1), where only the first twiddle factor value (W0) is needed but is used two times (or more, for stages after stage 1). This can allow a reduction in the size of memory needed to store the table of twiddle factors 106 for a given FFT computation, and possibly also in the cost (in time) of loading the twiddle factors 106 for use by the FFT butterfly instruction.

At step 418 in FIG. 4a, a conjugation parameter 316 is detected from a control bit, variant opcode, or the like. According to embodiments of the present invention, the value of the twiddle factor operand 308 (from step 406) may be modified in order to switch between forward and inverse FFT butterfly operations 100. By using the complex conjugate (achieved by negating the imaginary part, equivalent to negating the angle α) of every twiddle factor value in the entire series of FFT butterfly operations 100, the direction of the transform can be changed between forwards (i.e., from time domain to frequency domain) and inverse (i.e., from frequency domain to time domain).

Therefore, a conjugation parameter 316 (from a control register or appropriate choice of variant opcode) detected at step 418 allows the direction of the FFT to be controlled (i.e., forward FFT versus inverse FFT) by (if active) effectively negating the imaginary part of the W0 and W1 operand lanes as they are applied in the FFT butterfly operation 100. If the conjugation control parameter 316 is active, the control flow passes to step 421 for an inverse FFT butterfly operation 100, for example. Otherwise, if the conjugation parameter is inactive, the control flow passes to step 424 for a forward FFT butterfly operation 100, for example.

Figure 3D:
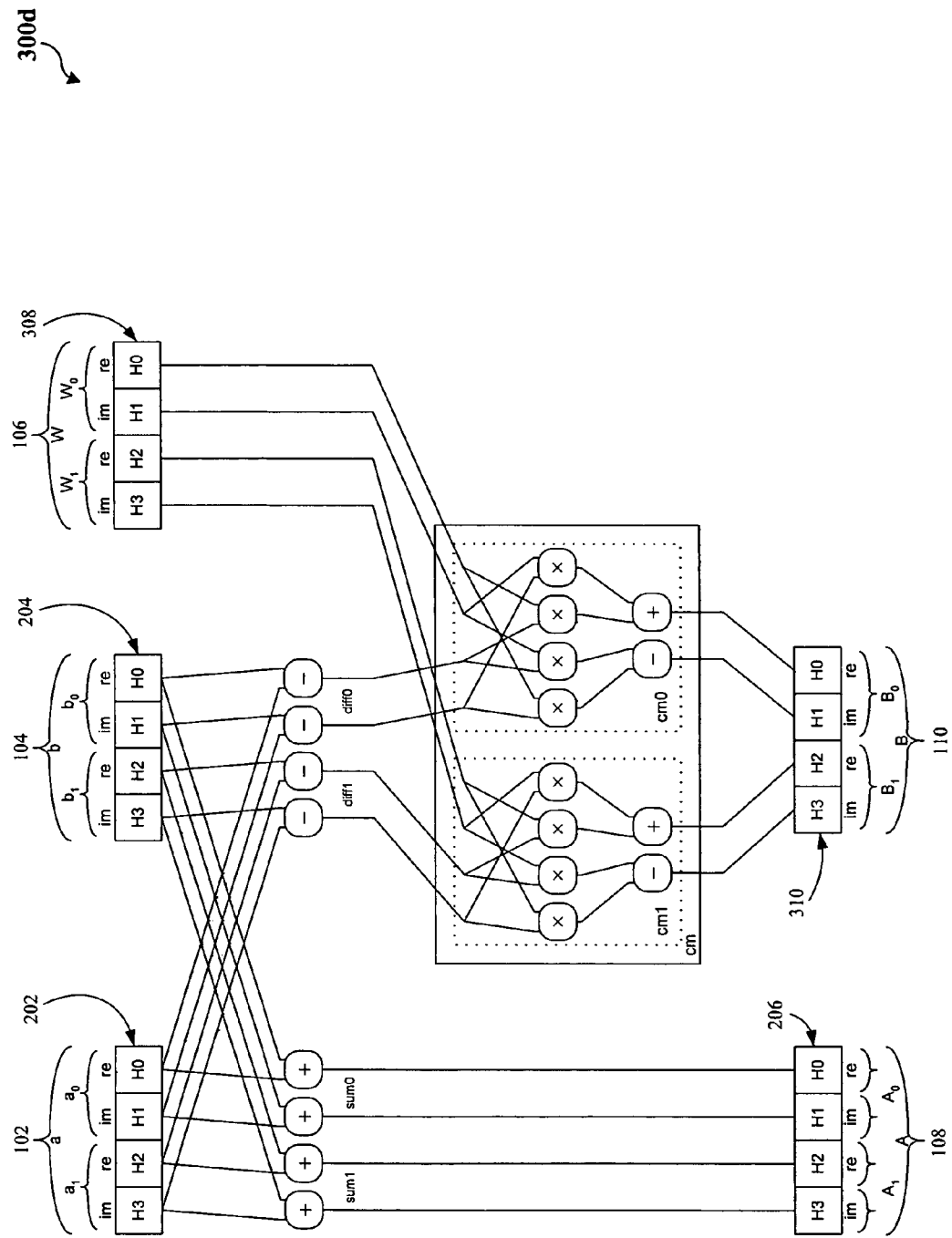
FIG. 3d is a logical representation of a two-way SIMD FFT butterfly operation with conjugation.

The activation of conjugation parameter 316 can be explained with reference to FIG. 3d, which shows another embodiment of a two-way SIMD implemented FFT butterfly operation. The arithmetic operation 300d is shown in FIG. 3d in conjugation mode. Comparing operation 300a (i.e., without conjugation) with operation 300d (i.e., conjugation mode), the "−" and "+" signs are switched in the "cm0" and "cm1" last stages, which results in changing the direction of the FFT.

It should be noted, however, that the actual direction of the transform is not controlled absolutely, but in a relative manner by the conjugation parameter 316, since the initial sign of the imaginary part of each twiddle factor value (W0 and W1) as supplied in twiddle factor operand 308 can be chosen to be positive or negative as preferred by the programmer. An advantage arising from the conjugation control bit is to allow the same sequence of instructions to implement either a forward FFT or an inverse FFT computation as desired, simply by setting or clearing this bit before executing the sequence, and by using the same set of twiddle factors 106 for either direction. This can reduce the size of program code and/or twiddle factor data, in cases where both directions of transform need to be available (e.g., in a modem where inverse FFT is used on transmission and FFT on reception).

Referring back to FIG. 4a at step 427, a scaling parameter 312 is detected from a control bit, variant opcode, or the like. In different circumstances, the magnitude of the values used in the FFT butterfly operations 100 may need to be controlled to, for example, avoid arithmetic overflow within the FFT butterfly operations 100 that could otherwise occur through the limitations of finite-length binary arithmetic. Referring back to FIG. 1, the magnitude of output values 108 or 110 in a given FFT butterfly step can grow relative to the corresponding fields of the input values 102 and 104. If this happens repeatedly through the S stages of the FFT computation, it is possible for an output point to have a magnitude as much as $2^S$ times the average input point magnitude. Without extending the length of the binary arithmetic used as the FFT computation proceeds through successive stages, such magnitude growth can cause severe problems in practical use. Examples of such problems are described by Proakis, J. G. & Manolakis, D. G. in *Digital Signal Processing*, New York, Maxwell Macmillan, 1992, Chapter 9, ISBN 0-02-946378, incorporated herein by reference.

In an embodiment of the present invention, the FFT butterfly operation outputs 108 and 110 can be divided by some power of two in order to prevent such effects. Such division can be achieved very cheaply in digital logic by means of a shift rather than a full arithmetic division. For greatest efficiency, this division step can be applied as part of each butterfly operation rather than as a separate operation. One possible way to implement this scaling is to perform it as part of the initial addition and subtraction steps which are performed with the input operands. Another possible way to implement it is to perform it just before the output of the results from the overall FFT butterfly operation. Hence, scaling by a factor of 1/N overall is accomplished by simply applying a scaling of every butterfly operation by ½ at each stage of the FFT computation.

However, in many cases, such an overall scaling factor will be overly pessimistic (and cause unacceptable loss of arithmetic precision in the results), as described by Proakis, J. G. & Manolakis, D. G. in *Digital Signal Processing*, New York, Maxwell Macmillan, 1992, Chapter 9, ISBN 0-02-946378, incorporated herein by reference. Therefore, in another embodiment of the present invention, an intermediate degree of scaling (e.g., by $1/\sqrt{N}$) is achieved by choosing to perform a division by two in every butterfly operation of only some of the stages (e.g., half of them, for a case where the number of stages S is even) rather than in every stage.

Referring back to FIG. 4a, if a scaling parameter 312 is active at step 427, the control flow passes to step 430, and a butterfly gain of ½ is selected as discussed above. Otherwise if the scaling parameter 312 is inactive at step 427, the control flow passes to step 433, and a butterfly gain of one is selected.

Figure 3E:
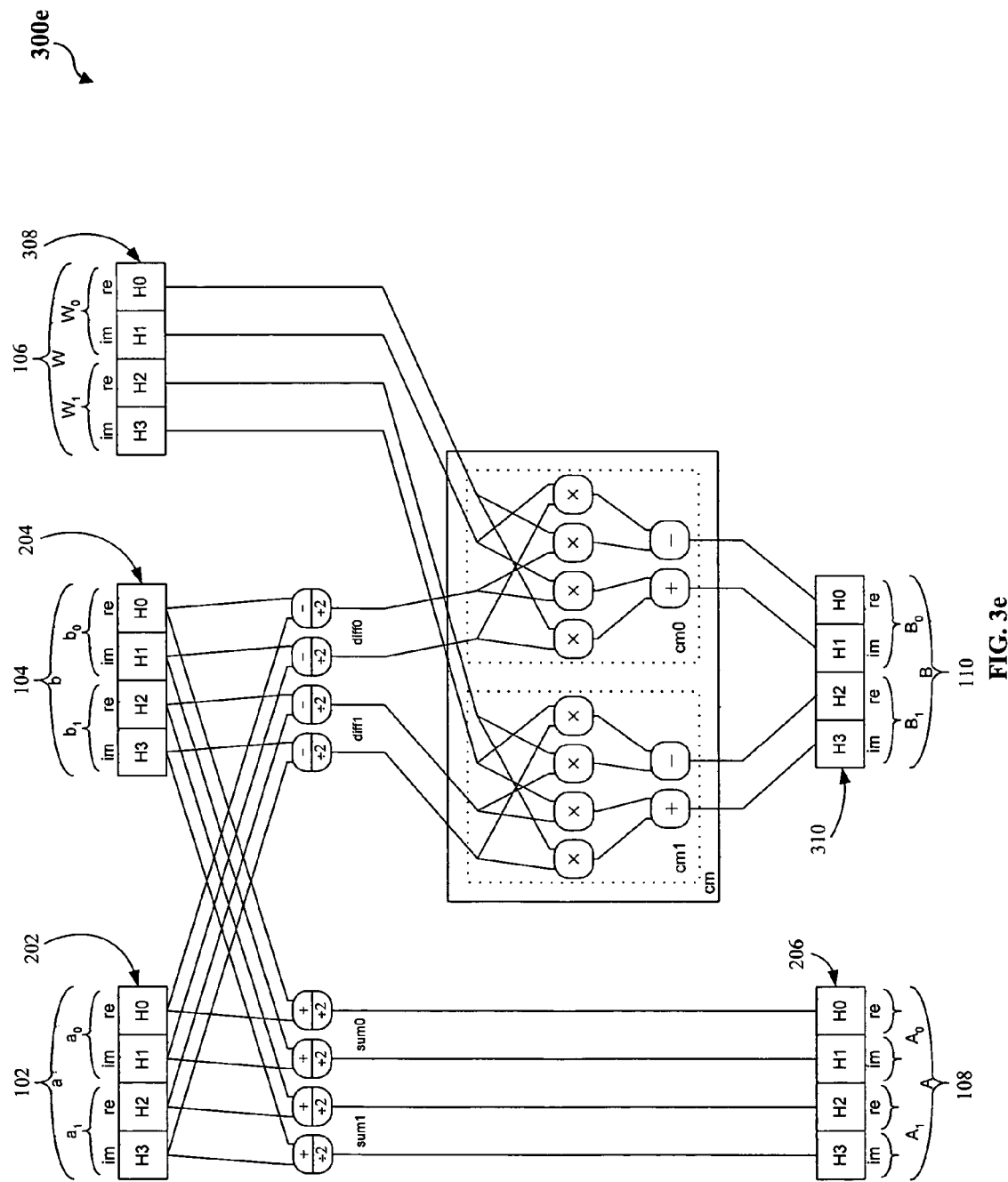
FIG. 3e is a logical representation of a two-way SIMD FFT butterfly operation with scaling.

FIG. 3e shows another embodiment of a two-way SIMD implemented FFT butterfly operation in scaling mode. The arithmetic operation 300e, shown in FIG. 3e, includes a "divide-by-2" gain adjustment. The present invention permits the gain of the FFT butterfly to be adjusted on a stage-by-stage basis to achieve the desired overall gain, by setting or clearing a scaling control bit in a control register (or varying the opcode used) between stages as required. Without it, scaling of the FFT butterfly would need to be implemented separately by additional instructions, thus increasing the cost of performing a suitably scaled forward FFT or inverse FFT.

At step 436 in FIG. 4b, an interleaving parameter 318 is detected from a control bit, variant opcode, or the like. Referring back to FIG. 3a, the interleaving parameter 318 allows a reordering of the complex output values 108 and 110 in output operands 206 and 310, respectively. As shown in FIG. 3a, operand 206 includes two instances of value 108 (shown as A0 and A1), and operand 310 includes two instances of value 110 (shown as B0 and B1).

If an interleaving parameter 318 is inactive at step 436, the control flow passes to step 439, and complex output values in operand 206 (in FIG. 3a) are, order least-significant to most-significant part of the operand, the values of sum0 and sum1 from the addition units. Similarly, the complex output values in output operand 310 are, order of least-significant to most-significant part of the operand, the values of prod0 and prod1 from the complex multiplication units cm0 and cm1, respectively.

In other words, reading output operand 206 and output operand 310 in turn, and in least-significant-to-most-significant order, the complex values appear as (sum0, sum1) for output operand 206, and (prod0, prod1) for output operand 310.

Otherwise, if the interleaving parameter 318 is active at step 436, the control flow passes to step 442, and the two complex values in each of the two output values 108 and 110 are interleaved into each of output operands 206 and 310.

Figure 3F:
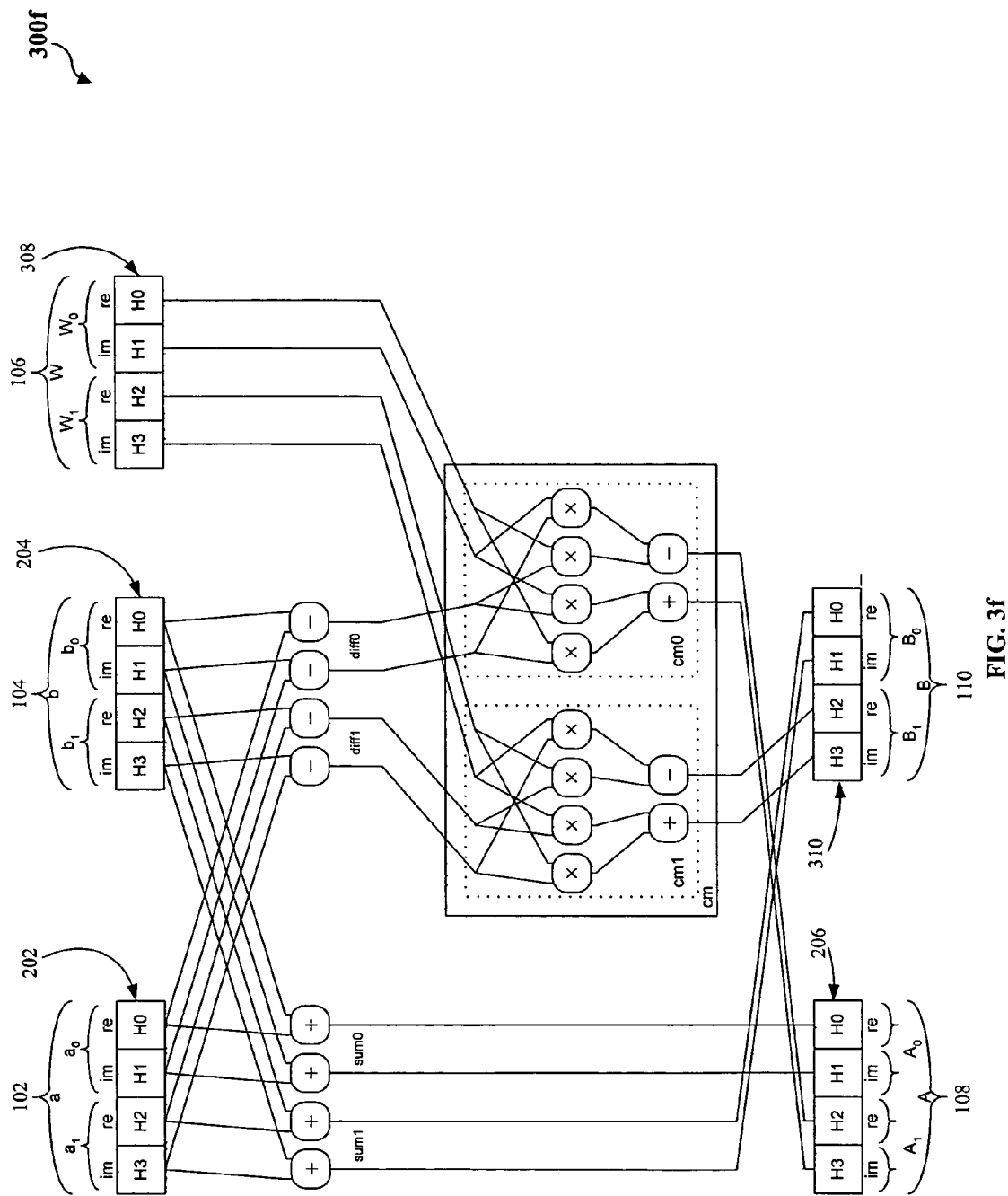
FIG. 3f is a logical representation of a two-way SIMD FFT butterfly operation with interleaving.

FIG. 3f shows another embodiment of a two-way SIMD implemented FFT butterfly operation. The arithmetic operation 300f, shown in FIG. 3f, interleaves the two complex values in each of the two output values 108 and 110 into output operands 206 and 310. In other words, in least-significant to most-significant part order, output operand 206 would contain first sum0 then prod0. In least-significant to most-significant part order, output operand 310 would contain first sum1 then prod1.

The interleaving parameter 318 is beneficial in cases where reordering of the complex values into output operands 206 and 310 in certain FFT butterfly stages is to be applied, as part of an FFT algorithm that allows both input and output arrays of the FFT computation (or the output and input arrays of the inverse FFT computation) to be in linear order of time and frequency, respectively. Applying interleaving using the interleaving parameter 318 reduces the cost of performing the reordering, by avoiding the use of further instructions to achieve the interleaving separately.

At step 445 in FIG. 4b, the FFT butterfly instruction is executed to perform a complete butterfly step for each of the two sets of input operands accessed at steps 403-406 [i.e., input (a0, b0, W0) and input (a1, b1, W1)] in 2-way SIMD fashion. The operation uses fixed-point fractional arithmetic, in respect of the twiddle factor (W) operands 308. The 16-bit component fields of twiddle factor operand 308 are treated as 2's complement fixed-point fractions with 1 (sign) bit to the left of the binary point and 15 bits of fraction to the right. This is appropriate because any twiddle factor value in the FFT butterfly is defined to have a scalar magnitude of one, hence neither component of a twiddle factor value can exceed the range [−1 . . . +1]. In fact using this scheme, there is a minor compromise to the range for positive components, that the maximum value which can be represented is actually 32767/32768 (i.e., 0.999969482 . . . ) rather than exactly 1.0. In practice, this limitation is not of great significance in most cases. The interpretation (in respect of scaling) of input operands 202 and 204 is not important, except that both operands are treated as using 2's complement format for their sign information, and both are implied to have the same scaling.

As discussed, the FFT butterfly instruction produces two results (i.e., output data values 108 and 110), which are written to output operands 206 and 310. Output operands 206 and 310 hold the result data in the same arrangement as for the input operands 202 and 204. In other words, in each of the output operands, each of the two 32-bit data values making up the operand is further subdivided into a 16-bit real part (i.e., H2 and H0) and a 16-bit imaginary part (i.e., H3 and H1). As in the case of the input operands 202 and 204, these 16-bit values (i.e., H3, H2, H1, and H0) are considered as 2's complement format values, but their absolute scaling is not of concern within the FFT butterfly operation; their scaling however must be the same for both, and is by definition also the same as that used by the input operands 202 and 204. After the appropriate results (with or without interleaving) have been written to output operands 206 and 310, the control flow ends as indicated at step 495.

In an embodiment, an instance of a SIMD FFT butterfly instruction can be initiated every processor cycle on an execution unit. As a result, a 2-way LIW SIMD processor such as the FirePath™ processor, containing two execution units, each adapted to execute the 2-way SIMD FFT butterfly instruction of the present invention, can initiate four FFT butterfly operations, using just two FFT butterfly instructions, coded in one 64-bit instruction word using 2-way LIW, in each processor cycle. Consequently, a 512-point complex FFT computation can be implemented by this processor in around 1,800 cycles. By comparison on the existing SIMD processor that is described above (a 2-way LIW SIMD processor without support for the SIMD FFT butterfly instruction of the present invention), around 3,600 cycles are required to implement a 512-point complex FFT, since that processor requires five cycles to initiate execution of a total of four individual butterfly operations.

As described above, the present invention has been implemented for a version of the radix-2 FFT algorithm called "decimation-in-frequency." This algorithm uses FFT butterfly operation 100. However, it should be understood that the present invention can equally be implemented for a "decimation-in-time" version of the FFT algorithm. An explanation of these two forms of the algorithm is given in Proakis, J. G. & Manolakis, D. G. in *Digital Signal Processing*, New York, Maxwell Macmillan, 1992, Chapter 9, ISBN 0-02-946378, incorporated herein by reference. In an embodiment, Equation 1 (described above) is replaced by the following equation to calculate FFT butterfly operation 100:

$$A = a + b \times W_n$$

$$B = a - b \times W_n \qquad \text{Equation 2}$$

As such, referring back to FIG. 1, an alternative version of FFT butterfly operation 100 would combine input values 102 and 104 (represented in Equation 2 by complex data values "a" and "b", respectively) with twiddle factor 106 (represented in Equation 2 by twiddle factor value "$W_n$") using the operations identified in Equation 2, to produce two output values 108 and 110 (represented in Equation 2 by complex values "A" and "B", respectively). Using such an embodiment, some changes would be required to the software code for the complete FFT computation, e.g. to perform the S stages of the FFT computation in reverse order (with an increasing number of twiddle factors at each successive stage rather than a decreasing number as with the decimation-in-frequency algorithm), but the general character of the computation is the same. The same control parameters (replication of twiddle factors, conjugation of twiddle factors, gain adjustment, interleaving) are equally applicable when using such an alternative version of the FFT butterfly operation. Based on the description herein, one skilled in the relevant art(s) would understand that the present invention is applicable to both "decimation-in-frequency" and "decimation-in-time" forms of FFT butterfly operation 100.

As described with reference to FIGS. 4a-4f, the FFT butterfly instruction of the present invention takes as input three 64-bit values and produces two 64-bit values as outputs, each capable of being logically subdivided into a plurality of instances, with each instance having real and imaginary parts. The embodiments described with reference to FIGS. 4a-4f introduce two instances for each of the three input and two output operands, representing a 2-way SIMD operation. However, the present invention can also be implemented with a greater quantity of instances, including for example 4-way, 8-way, and the like. Note also that the width of the input and output operands (in bits) could vary depending on the required precision of arithmetic calculation, both for the one-way (non-SIMD form), and for two or more ways of SIMD operation. For example, it would be possible to implement the 2-way SIMD FFT butterfly operation using 32-bit precision for the parts (real & imaginary) of each complex number, using input and output operands each of 128 bits, each comprised of two 64-bit complex numbers, each complex number having two 32-bit components. Alternatively it would be possible to implement e.g., a 4-way SIMD FFT butterfly instruction operating with 64-bit operands, where each operand contains four 16-bit complex numbers each of which is comprised of an 8-bit real part and an 8-bit imaginary part. (In practice, the reduced arithmetic precision of such an implementation might be insufficient for some applications, though adequate for others.)

In a further alternative implementation, either the number of bits in each part or the number of SIMD ways of parallel operation, or both, could be a number which is not expressible as a power of two. For example it would be possible to implement the present invention using 3-way SIMD where each complex number is represented in 40-bits, having a 20-bit real part and a 20-bit imaginary part, for a total of 120 bits in each of the input operands 202, 204 and 308, and each of the output operands 206 and 310. However, in such an embodiment, in which the number of SIMD ways is not an even number, the function of the replication and interleaving parameters would be less convenient to implement and use, so might be omitted.

As described above with reference to FIGS. 1 and 3a-3f, a 2-way SIMD version of FFT butterfly operation 100, for example, takes two instances (a0, a1) of input value 102 at the first input data operand 202. Input a0 includes 32-bits of data and input a1 includes 32 bits. Two instances (b0, b1) of input value 104 are taken at the second input data operand 204, with input b0 having 32-bits and input b1 having 32 bits. Finally, twiddle factor operand 308 takes two twiddle factor values (W0, W1) of twiddle factor 106, with twiddle factor value W0 having 32-bits and twiddle factor value W1 having 32 bits. Following the butterfly calculations, output operands 206 and 310 (shown in FIG. 3a without interleaving) receive the two 64-bit output values 108 and 110, with output value 108 including two 16-bit real parts in halfword lanes H2 and H0, and two 16-bit imaginary parts in halfword lanes H3 and H1. Similarly, output value 110 includes two 16-bit real parts in H2 and H0, and two 16-bit imaginary parts in H3 and H1.

Figure 5:
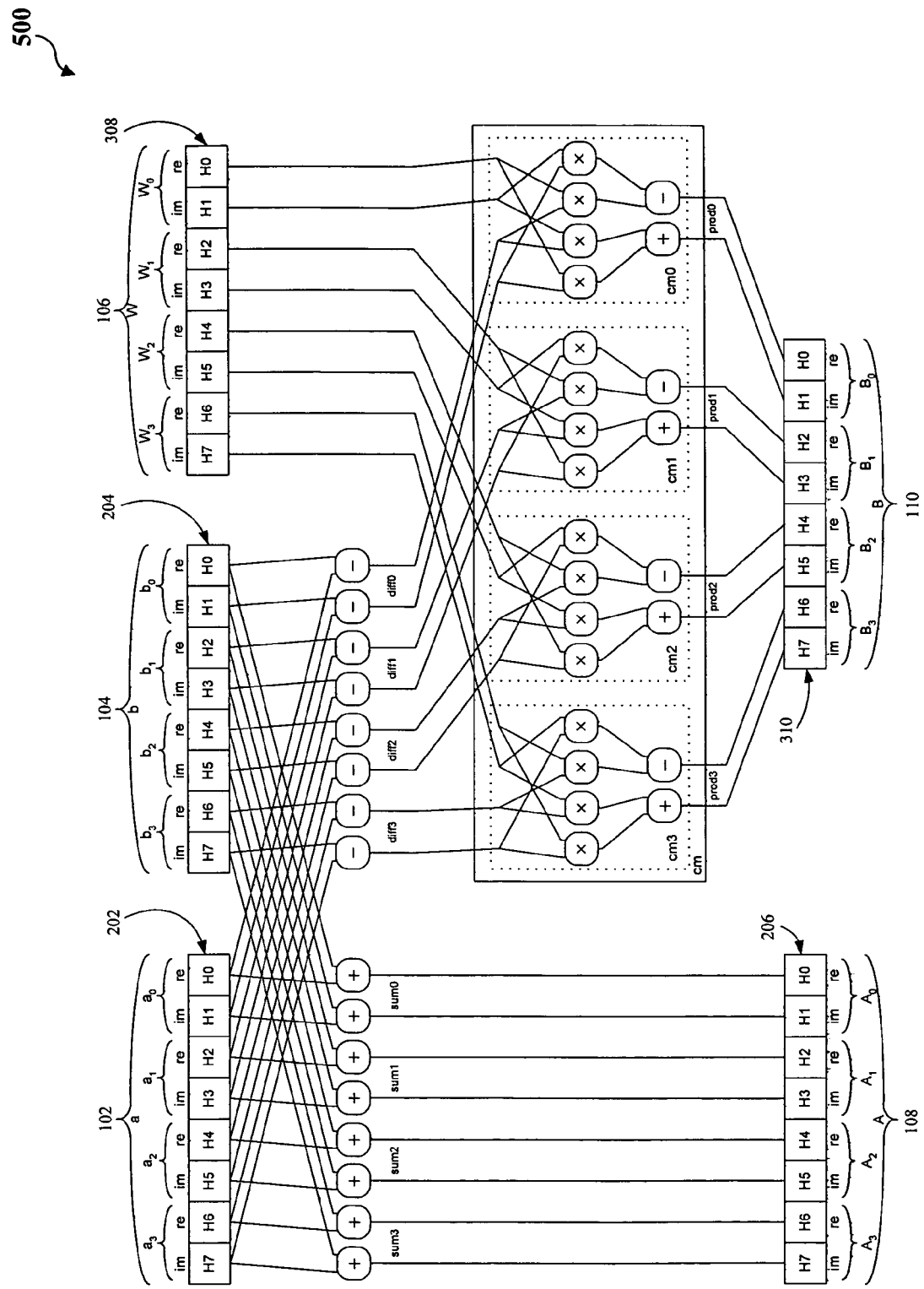
FIG. 5 illustrates a logical representation of a four-way SIMD FFT butterfly operation.

FIG. 5 illustrates a logical representation of a 4-way SIMD FFT butterfly operation 500, according to an embodiment of the present invention. Four instances of input values 102 and 104 are accessed at step 403 (described above with reference to FIG. 4a). For example, four instances (a0, a1, a2, a3) of input value 102 are taken at the first input data operand 202, with inputs a0, a1, a2, and a3 including 32 bits each of data. Four instances (b0, b1, b2, b3) of input value 104 are taken at the second input data operand 204, with each of inputs b0, b1, b2, and b3 including 32 bits. Each of inputs a0, a1, a2, a3, b0, b1, b2, and b3 also includes a 16-bit real part (shown as H6, H4, H2, and H0) and 16-bit imaginary part (shown as H7, H5, H3, and H1). Finally, twiddle factor operand 308 takes four twiddle factor values (W0, W1, W2, W3) of twiddle factor 106, with each twiddle factor value having 32-bits. Following the butterfly calculations, output operands 206 and 310 receive the two 128-bit output values 108 and 110, with output value 108 including four 16-bit real parts (shown as H6, H4, H2, and H0), and four 16-bit imaginary parts (shown as H7, H5, H3, and H1). Similarly, output value 110 includes four 16-bit real parts (shown as H6, H4, H2, and H0) and four 16-bit imaginary parts (shown as H7, H5, H3, and H1).

In another embodiment of the present invention, an eight-way version of a SIMD FFT butterfly operation can be produced by extrapolation, in a manner that is similar to the above description for extending a two-way version to produce a four-way version. For an 8-way SIMD FFT butterfly operation, eight instances of input values 102 and 104 are accessed at step 403 (described above with reference to FIG. 4a). Using for example 16-bit (halfword) precision in each component, eight instances (a0, a1, a2, a3, a4, a5, a6, a7) of input value 102 are taken at the first input data operand 202, with each of inputs a0, a1, a2, a3, a4, a5, a6, and a7 including 32 bits of data. Eight instances (b0, b1, b2, b3, b4, b5, b6, b7) of input value 104 are taken at the second input data operand 204, with each of inputs b0, b1, b2, b3, b4, b5, b6, and b7 including 32 bits. Therefore referring back to FIG. 5, input operands 202 and 204 would be modified to include the inputs (a0, a1, a2, a3, a4, a5, a6, a7) and (b0, b1, b2, b3, b4, b5, b6, b7), respectively. Each of inputs a0, a1, a2, a3, a4, a5, a6, a7, b0, b1, b2, b3, b4, b5, b6, and b7 also includes a 16-bit real part (which would be identified as lanes H14, H12, H10, H8, H6, H4, H2, and H0) and 16-bit imaginary part (in lanes H15, H13, H11, H9, H7, H5, H3, and H1).

Twiddle factor operand 308 would be modified to take eight twiddle factor values (W0, W1, W2, W3, W4, W5, W6, W7) of twiddle factor 106, with each twiddle factor value having 32-bits. Each twiddle factor value (W0, W1, W2, W3, W4, W5, W6, W7) includes a 16-bit real part (H14, H12, H10, H8, H6, H4, H2, and H0) and 16-bit imaginary part (H15, H13, H11, H9, H7, H5, H3, and H1).

Following the butterfly calculations, output operands 206 and 310 would be modified to receive two output values 108 and 110, with output value 108 including eight 16-bit real parts (in lanes H14, H12, H10, H8, H6, H4, H2, and H0), and eight 16-bit imaginary parts (in lanes H15, H13, H11, H9, H7, H5, H3, and H1). Similarly, output value 110 includes eight 16-bit real parts (in lanes H14, H12, H10, H8, H6, H4, H2, and H0), and eight 16-bit imaginary parts (in lanes H15, H13, H11, H9, H7, H5, H3, and H1). In such an embodiment, each of the input and output operands would have 256 bits in total.

Referring back to step 436 in FIG. 4b, interleaving is an option that can be applied to FFT butterfly operation 100 when it is used in SIMD form (two or more instance of the operation). If applied, interleaving modifies the order of the elements of the two output values 108 and 110 within output operands 206 and 310. The interleaving order is also influenced by whether the FFT butterfly operation 100 is implemented as 2-way SIMD, 4-way SIMD, 8-way SIMD, or the like.

Referring back to FIG. 3a, output operands 206 and 310 show the output results for an embodiment using 2-way SIMD that does not implement interleaving (at step 439 in FIG. 4b). As described above, the individual complex values which make up the output operand 206, from least-significant to most-significant 32-bit lane, are identified as "sum0" and "sum1". The individual complex values which make up the output operand 310, from least-significant to most significant 32-bit lane, are identified as "prod0" and "prod1".

If, on the other hand, interleaving is implemented (at step 442 in FIG. 4b), output operands 206 and 310 include the output results shown in FIG. 3f. As described above, the individual complex values which make up the output operand 206, from least-significant to most-significant 32-bit lane, are identified as "sum0" and "prod0". The individual complex values which make up the output operand 310, from least-significant to most significant 32-bit lane, are identified as "sum1" and "prod1".

The effects of interleaving in a 4-way SIMD version of FFT butterfly operation 100 can be explained with reference to FIG. 5. Comparing FIG. 5 to the above description of FIG. 3, it can be seen that arithmetic operation 500 includes four SIMD complex additions that produce and supply sum "sum3" as A3 in output value 108, sum "sum2" as A2 in output value 108, sum "sum1" as A1 in output value 108, and sum "sum0" as A0 in output value 108. Four SIMD complex multiplications are performed in each of four sub-blocks labeled "cm3", "cm2", "cm1", and "cm0". The outputs of the SIMD complex multiplications are supplied as "prod3" to B3 in output value 110, "prod2" to B2 in output value 110, "prod1" to B1 in output value 110, and "prod0" to B0 in output value 110.

Hence referring to FIG. 5, output operands 206 and 310 show the output results for an embodiment that does not implement interleaving (at step 439 in FIG. 4b). The individual complex values which make up the output operand 206, from least-significant to most-significant 32-bit lane, are identified as "sum0", "sum1", "sum2", and "sum3". The individual complex values which make up the output operand 310, from least-significant to most significant 32-bit lane, are identified as "prod0", "prod1", "prod2", and "prod3".

If, on the other hand, interleaving is implemented (at step 442 in FIG. 4b), output operands 206 and 310 include the complex values in each of the two output results in interleaved order, with "sum0", "prod0", "sum1", and "prod1" (in output operand 206), followed by "sum2", "prod2", "sum3", and "prod3" (in output operand 310).

The effects of interleaving in an 8-way SIMD version of FFT butterfly operation 100 can be explained by extrapolation from the above description with reference to FIG. 5. For example, arithmetic operation 500 in FIG. 5 would be modified, for an 8-way SIMD FFT butterfly operation, to include eight SIMD complex additions to produce and supply sum "sum7" as A7 in output value 108, sum "sum6" as A6 in output value 108, sum "sum5" as A5 in output value 108, sum "sum4" as A4 in output value 108, sum "sum3" as A3 in output value 108, sum "sum2" as A2 in output value 108, sum "sum1" as A1 in output value 108, and sum "sum0" as A0 in output value 108. Eight SIMD complex multiplications are performed in each of eight sub-blocks that could be labeled "cm7", "cm6", "cm5", "cm4", "cm3", "cm2", "cm1", and "cm0". The outputs of the SIMD complex multiplications are supplied as "prod7" to B7 in output value 110, "prod6" to B6 in output value 110, "prod5" to B5 in output value 110, "prod4" to B4 in output value 110, "prod3" to B3 in output value 110, "prod2" to B2 in output value 110, "prod1" to B1 in output value 110, and "prod0" to B0 in output value 110.

Therefore referring to FIG. 5, output operands 206 and 310 would be modified (for an 8-way SIMD FFT butterfly operation), such that the individual complex values which make up the output operand 206, from least-significant to most-significant 32-bit lane, are identified as "sum0", "sum1", "sum2", "sum3", "sum4", "sum5", "sum6", and "sum7". The individual complex values which make up the output operand 310, from least-significant to most significant 32-bit lane, are identified as "prod0", "prod1", "prod2", "prod3", "prod4", "prod5", "prod6", and "prod7".

If, on the other hand, interleaving is implemented (at step 442 in FIG. 4b), output operands 206 and 310 include the output results in the following order: "sum0", "prod0", "sum1", "prod1", "sum2", "prod2", "sum3", "prod3" (in order of increasing significance in output operand 206) then "sum4", "prod4", "sum5", "prod5", "sum6", "prod6", "sum7", "prod7" (in output operand 310).

Referring back to step 409, replication is another option that can be applied to FFT butterfly operation 110. As discussed, if replication is not performed, FFT butterfly operation 110 proceeds to utilize all elements of each input operand (i.e., 202, 204, and 308). If replication is performed (as specified by setting replication control bit(s) appropriately in a control register, or by a variant opcode), twiddle factor operand 308 is treated differently. A modified version of twiddle factor operand 308 is created internally to contain a replication of some element(s). The replicated element(s) are also influenced by whether the FFT butterfly operation 100 is implemented as 2-way SIMD, 4-way SIMD, 8-way SIMD, or the like.

If, for example, replication is specified (at step 409 in FIG. 4a) for 2-way SIMD, twiddle factor operand 308 (shown in FIGS. 3a-3f) is modified to hold the values (W0, W0). These values of twiddle factor 106 are, therefore, utilized for FFT butterfly operation 100. The twiddle factor value W1 is ignored. Thus, as described above, the input values (a1, b1) are utilized with twiddle factor value W0 instead of twiddle factor value W1 as twiddle factor 106. The input values (a0, b0) are utilized with twiddle factor value W0 as twiddle factor 106.

For a 4-way SIMD implementation of FFT butterfly operation 100, three options for replication are available: no replication; 2-way replication; and 4-way replication. If replication is not performed (at step 415 in FIG. 4a), FFT butterfly operation 100 proceeds to utilize all elements of each input operand (i.e., 202, 204, and 308), as described above with reference to FIG. 5.

If, in the case of 4-way SIMD, 2-way replication is performed (at step 412 in FIG. 4a), a modified version of twiddle factor operand 308 is created internally to contain the values (W0, W0, W2, W2). These values of twiddle factor 106 are utilized for FFT butterfly operation 100. The twiddle factor values W1 and W3 are ignored. Thus, input values (a1, b1) are utilized with twiddle factor value W0 instead of W1 as twiddle factor 106. The input values (a3, b3) are utilized with W2 instead of W3 as twiddle factor 106. The input values (a0, b0) and (a2, b2) are utilized with W0 and W2, respectively, as twiddle factor 106.

If, in the case of 4-way SIMD, 4-way replication is performed (at step 412 in FIG. 4a), a modified version of twiddle factor operand 308 is created internally to contain the values (W0, W0, W0, W0). These values of twiddle factor 106 are utilized for FFT butterfly operation 100. The twiddle factor values W1, W2 and W3 are ignored. Thus, input values (a1, b1) are utilized with W0 instead of W1 as twiddle factor 106. The input values (a2, b2) are utilized with W0 instead of W2 as twiddle factor 106. The input values (a3, b3) are utilized with W0 instead of W3 as twiddle factor 106. The input values (a0, b0) are utilized with W0 as twiddle factor 106.

For 8-way SIMD implementation of FFT butterfly operation 100, four options for replication are available: no replication; 2-way replication; 4-way replication; and 8-way replication. If replication is not performed (at step 415 in FIG. 4a), FFT butterfly operation 100 proceeds to utilize all eight complex elements of each input operand (i.e., 202, 204, and 308).

If, in the case of 8-way SIMD, 2-way replication is performed (at step 412 in FIG. 4a), a modified version of twiddle factor operand 308 is created internally containing the values (W0, W0, W2, W2, W4, W4, W6, W6). These are utilized for FFT butterfly operation 100. The twiddle factor values W1, W3, W5 and W7 are ignored. As described above, for purposes of explanation, the individual complex output lanes of output value 110 can be identified as "prod0", "prod1", "prod2", etc., up to "prod7." Thus, prod1 is calculated by utilizing W0 instead of W1 as twiddle factor 106; prod3 is calculated by utilizing W2 instead of W3 as twiddle factor 106; prod5 is calculated by utilizing W4 instead of W5 as twiddle factor 106; and prod7 is calculated by utilizing W6 instead of W7 as twiddle factor 106. The even-numbered lanes prod0, prod2, prod4, and prod6 are calculated, as when no replication is performed, using W0, W2, W4, and W6 as respective values of twiddle factor 106.

If, in the case of 8-way SIMD, 4-way replication is performed (at step 412 in FIG. 4a), a modified version of twiddle factor operand 308 is created internally containing the values (W0, W0, W0, W0, W4, W4, W4, W4). These values of twiddle factor 106 are utilized for FFT butterfly operation 100. The twiddle factor values W1, W2, W3, W5, W6, and W7 are ignored. Thus, the value prod1, prod2, and prod3 are all calculated by utilizing W0 as twiddle factor 106, instead of W1, W2, and W3, respectively, as it happens when no replication is performed. Similarly, prod5, prod6, and prod7 are calculated utilizing the value of W4 as twiddle factor 106, instead of W5, W6, and W7, respectively, as it happens when no replication is performed. Lanes prod0 and prod4 are calculated in the same manner as when no replication is performed, using the values of W0 and W4, respectively as twiddle factor 106.

If 8-way replication is performed (at step 412 in FIG. 4a), a modified version of twiddle factor operand 308 is created internally to contain the values (W0, W0, W0, W0, W0, W0, W0, W0). These values of twiddle factor 106 are utilized for FFT butterfly operation 100. The twiddle factor values W1, W2, W3, W4, W5, W6, and W7 are ignored. Thus, all of the complex product values prod0, prod1, prod2, prod3, prod4, prod5, prod6 and prod7 are calculated using the value of W0 as twiddle factor 106.

An example implementation of the present invention is provided below in Function A, which includes pseudo code for the FFT butterfly instruction of the present invention. The exemplary FFT butterfly instruction is called "BFLYH", which is short for ButterFLY on Halfwords, but the mnemonic used herein is incidental, and any mnemonic could be used. Instruction BFLYH can be called for execution on a SIMD processor (adapted to execute the FFT butterfly instruction of the present invention) by the instruction:

BFLYH aA, bB, W

As described above with reference to FIGS. 1-6, the FFT butterfly instruction of the present invention in the general case uses five operands (i.e., input operand 202, input operand 204, twiddle factor operand 308, output operand 206, and output operand 310). However in this example embodiment, instruction BFLYH is specified with three 64-bit operands aA, bB and W. Of these, aA and bB function as both inputs and outputs, while W is purely an input.

The operation performed by instruction BFLYH takes the original values of aA and bB as its data (variable) input operands (e.g., operands 202 and 204), and the value of W as its twiddle factor input operand (e.g., twiddle factor operands 308). Upon completion, two 64-bit result values (e.g., 108 and 110) are written back to aA and bB, replacing the original values in those operands. In this particular embodiment, an additional source of values used in the execution of instruction BFLYH is a control register (as described above regarding, for example, the four operation parameters). In Function A (below), the variable BSR (which stands for the incidental name "Butterfly Status Register") refers to four control bits that yield the four operation control parameters (i.e., scaling parameter 312, replication parameter 314, conjugation parameter 316, and interleaving parameter 318) discussed above, which are given symbolic names "Divide2," "Replicate," "Conjugate", and "Interleave" corresponding to the respective functions they control (i.e., scaling, replication, conjugation, and interleaving, respectively). The conditional statement in Function A pertaining to "BSR.Replicate" corresponds to interpretation of the replication parameter 314, and determines which twiddle factor values are to be utilized during the calculations. The conditional statement pertaining to "BSR.Divide2" corresponds to interpretation of the scaling parameter 312 as described above, and determines the gain value that is used (1 or ½), to permit control of arithmetic ranging and avoid arithmetic overflow. The conditional statement pertaining to "BSR.Interleave" corresponds to interpretation of the interleaving parameter 318, and determines the order of the elements in the output operands. The conditional statement within the COMPMUL sub-function of Function A, pertaining to "BSR.conjugate", corresponds to interpretation of the conjugation parameter 316, and allows the direction of the FFT butterfly operation to change between inverse and forward directions.

The instruction's behavior, including the effect of the four parameters, is described by the following pseudo code represented in Function A, in which "twiddle," "sum," "diff," "diffR," "resultA", and "resultB" are internal temporary values:

```
FUNCTION A:
    if (BSR.Replicate = 1) {
        twiddle.<63..32> = W.<31..0>
    } else {
        twiddle.<63..32> = W.<63..32>
    }
    twiddle.<31..0> = W.<31..0>
    if (BSR.Divide2) {
        sum = AVRSH (aA, bB)
        diff = DVRSH (aA, bB)
    } else {
        sum = ADDSSH (aA, bB)
        diff = SUBSSH (aA, bB)
    }
    diffR = COMPMUL(diff, twiddle)
    resultA.<31..0> = sum.<31..0>
    If (BSR.Interleave) {
        resultA.<63..32> = diffR.<31..0>
        resultB.<31..0> = sum.<63..32>
    } else {
        resultA.<63..32> = sum.<63..32>
        resultB.<31..0> = diffR.<31..0>
    }
    resultB.<63..32> = diffR.<63..32>
    aA.<63..0> = resultA.<63..0>
    bB.<63..0> = resultB.<63..0>
```

The various sub-functions used above are now described.

The sub-function "ADDSSH (x,y)" performs a 4-way SIMD halfword addition operation (see example, FIG. 2 and FIGS. 3a-3f) across the four 16-bit lanes of 64-bit operands x and y. Saturation of the results to the 16-bit range is performed, with each 16-bit lane considered for purposes of saturation as a 2's complement number in the range [−32768 . . . +32767]. Each of its four 16-bit output lanes out.$H_i$ (i=0.3) is produced from the corresponding 16-bit lanes of x and y as:

out.$H_i$=SSH(x.$H_i$+y.$H_i$)

where:

SSH(v)=−32768, v<−32768;

SSH(v)=+32767, v>+32767;

SSH(v)=v, otherwise.

The sub-function "SUBSSH (x,y)" performs a 4-way SIMD subtraction operation across the four 16-bit lanes of 64-bit operands x and y. Saturation of the results to the 16-bit range is performed, with each 16-bit lane considered for purposes of saturation as a 2's complement number in the range [−32768 . . . +32767]. Each of its four 16-bit output lanes out.$H_i$ (i=0 . . . 3) is produced from the corresponding lanes of x and y as:

out.$H_i$=SSH(x.$H_i$−y.$H_i$)

where SSH(v) is as defined as for ADDSSH above.

The sub-function "AVRSH (x,y)" performs a 4-way SIMD averaging operation ((x+y)/2) across the four 16-bit lanes of 64-bit operands x and y, with each 16-bit lane considered as a 2's complement number in the range [−32768 . . . +32767]. Each of its four 16-bit output lanes out.$H_i$ (i=0 . . . 3) is produced from the corresponding lanes of x and y as:

out.$H_i$=(x.$H_i$+y.$H_i$)/2

The sub-function "DVRSH (x,y)" performs a 4-way SIMD divergence operation ((x−y)/2) across the four 16-bit lanes of 64-bit operands x and y, with each 16-bit lane considered as a 2's complement number in the range [−32768 . . . +32767]. Each of its four 16-bit output lanes out.$H_i$ (i=0 . . . 3) is produced from the corresponding lanes of x and y as:

out.$H_i$=(x.$H_i$−y.$H_i$)/2

The sub-function "COMPMUL(x,y)" performs a 2-way SIMD complex multiplication operation across the two 32-bit complex lanes of its x and y operands, further controlled by the 1-bit conjugate control bit accessed as BSR.conjugate. The input data for each of x and y is further subdivided into two pairs of 16-bit lanes (real part in less significant position, imaginary part in more significant position), or simply as four 16-bit lanes numbered 0 . . . 3 where lane 0 is the least significant and lane 3 the most significant. Each 16-bit lane is considered as a signed 2's complement number. The operation is defined to return a 64-bit result, again considered as two 32-bit complex values (i.e., pairs of 16-bit lanes) or just as four 16-bit lanes. The output of COMPMUL in the latter view is defined to be four 16-bit lanes out.$H_i$ (i=0 . . . 3) as follows:

```
if (BSR.conjugate) {
    out.H0 = SSH(RNE15(x.H0 * y.H0 + x.H1 * y.H1))
    out.H1 = SSH(RNE15(x.H1 * y.H0 − x.H0 * y.H1))
    out.H2 = SSH(RNE15(x.H2 * y.H2 + x.H3 * y.H3))
    out.H3 = SSH(RNE15(x.H3 * y.H2 − x.H2 * y.H3))
} else {
    out.H0 = SSH(RNE15(x.H0 * y.H0 − x.H1 * y.H1))
    out.H1 = SSH(RNE15(x.H1 * y.H0 + x.H0 * y.H1))
    out.H2 = SSH(RNE15(x.H2 * y.H2 − x.H3 * y.H3))
    out.H3 = SSH(RNE15(x.H3 * y.H2 + x.H2 * y.H3))
}
``` where:

SSH(v) is as defined as for ADDSSH above

RNE15(v) is defined as treating v as a signed 2's complement fixed-point value with 15 bits of fractional part; it returns the signed integer part of the value only, discarding the least significant 15 bits, and rounding the result in accordance with the value of the fractional part, such that the result is rounded to the nearest integer to v; if the fractional part represents 0.5 exactly (either upper or lower integer is equally near) then the result is chosen as the nearest even integer to v.

For purposes of definition for the sub-function "COMPMUL (x,y)", all the 16-bit lanes of both x and y operands are considered as signed 2's complement integers with no fractional part, although logically the BFLYH instruction's W operand is comprised of 16-bit lanes whose effect is as if they were fixed-point values with 15-bits of fractional part, and its a and b input operands have no particular scaling implied, except both operands are obliged to be scaled in the same way. The change of representation with respect to the W operand, passed to the COMPUL sub-function as its y operand, is effected by the use of the RNE15 function in the definition of COMPMUL.

In the above definitions, the following notation conventions are used:

| | |
|---|---|
| val.n | where n is an integer constant, means bit n of value val, where bit 0 is the least significant bit and bit 1 is the next more significant bit, etc. |
| val.{i, j, k, . . . } | where i, j, k, . . . are integer constants, is a shorthand way of writing val.i, val.j, val.k, . . . |
| val.<m . . . n> | where m and n are integer constants and m > n, means the linear bit sequence (val.m, val.(m−1), . . . val.n) considered as an ordered composite multi-bit entity where val.m is the most significant bit and val.n the least significant bit of the sequence |
| val.$H_0$ | is equivalent to val.<15 . . . 0> |
| val.$H_1$ | is equivalent to val.<31 . . . 16> |
| val.$H_2$ | is equivalent to val.<47 . . . 32> |
| val.$H_3$ | is equivalent to val.<63 . . . 48> |

FIGS. 1-6 are conceptual illustrations useful for explaining the present invention. For example, the present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention.

It should be understood that aspects of the present invention (including these functional building blocks) could be implemented in hardware, firmware, software, or a combination thereof. In such an embodiment, the various components and steps (or portions thereof) would be implemented in hardware, firmware, and/or software to perform the functions of the present invention. That is, the same piece of hardware, firmware, or module of software could perform one or more of the illustrated blocks (i.e., components or steps).

In this document, the terms "computer program medium" and "computer usable medium" are used to generally refer to media such as a removable storage unit, a hard disk installed in hard disk drive, and signals (i.e., electronic, electromagnetic, optical, or other types of signals capable of being received by a communications interface). These computer program products are means for providing software to a computer system. The invention, in an embodiment, is directed to such computer program products.

In an embodiment where aspects of the present invention are implemented using software, the software can be stored in a computer program product and loaded into computer system using a removable storage drive, hard drive, or communications interface. The control logic (software), when executed by a processor, causes the processor to perform the functions of the invention as described herein.

In another embodiment, aspects of the present invention are implemented primarily in hardware using, for example, hardware components such as application specific integrated circuits (ASICs). Implementation of the hardware state machine so as to perform the functions described herein will be apparent to one skilled in the relevant art(s).

In yet another embodiment, the invention is implemented using a combination of both hardware and software.

While various embodiments of the present invention have been described above, it should be understood that they have been presented by way of example, and not limitation. It will be apparent to one skilled in the relevant art(s) that various changes in form and detail can be made therein without departing from the spirit and scope of the invention. Moreover, it should be understood that the method, system, and computer program product of the present invention could be implemented with any type of communications device including, but not limited to, cable modems, set-top boxes, headends, communication gateways, switches, routers, Internet access facilities, servers, personal computers, enhanced telephones, personal digital assistants (PDA), televisions, or the like. Thus, the present invention should not be limited by any of the above-described exemplary embodiments, but should be defined only in accordance with the following claims and their equivalents.

What is claimed is:

1. A system for executing an FFT instruction in a hardware processor to process communication data, comprising:
   a first electronic input configured to access at least one instance of two complex values of the communication data stored in at least one first storage location associated with the hardware processor;
   a second electronic input configured to access at least one twiddle factor value stored in at least one second storage location associated with the hardware processor, each accessed at least one twiddle factor associated with a respective one of the accessed at least one instance of two complex values;
   an electronic storage location configured to store an operation parameter for varying the behavior of the FFT instruction; and
   electronic transform means configured to execute the FFT instruction according to the operation parameter using the accessed at least one instance of two complex values and accessed at least one twiddle factor value to transform the communication data to at least two outputs corresponding to processed communication data, wherein initiation of execution of the FFT instruction occurs in a single processor cycle.

2. The system of claim 1, wherein said operation parameter identifies a twiddle factor from said at least one twiddle factor value, wherein said functional means applies the identified twiddle factor to execute the FFT instruction.

3. The system of claim 1, wherein said operation parameter instructs said functional means to perform an inverse FFT operation or a forward FFT operation.

4. The system of claim 1, wherein said operation parameter instructs said functional means to adjust a gain value to control overflow when executing the FFT instruction.

5. The system of claim 1, wherein said operation parameter is applied to reorder elements of an output from said two outputs.

6. A system for executing an FFT instruction in a hardware processor to process communication data, comprising:
   a control register that includes one or more bits for selecting operation parameters of the FFT instruction;
   a processor that executes one or more instances of the FFT instruction;
   at least one first storage location associated with the hardware processor for storing at least one instance of two complex values;
   at least one second storage location associated with the hardware processor for storing at least one twiddle factor value, each at least one twiddle factor associated with a respective one of the stored at least one instance of two complex values; and
   a functional unit adapted to access said at least one instance of two complex values, said at least one twiddle factor value, and said operation parameter, and further adapted to execute the FFT instruction according to the detected operation parameter using the accessed at least one instance of two complex values and accessed at least one twiddle factor value to produce at least two outputs of processed communication data, wherein initiation of execution of the FFT instruction occurs in a single processor cycle.

7. The system of claim 6, wherein said operations means comprises at least one register, wherein a control bit specifies said operation parameter.

8. The system of claim 6, wherein said operations means comprises at least one opcode, wherein said at least one opcode specifies said operation parameter.

9. The system of claim 6, wherein said operation parameter includes at least one of a replication parameter, a conjugation parameter, a scaling parameter, and an interleaving parameter.

10. A computer-readable storage medium having computer readable program code recorded thereon that, when executed by a processor, causes the processor to perform a method, the method comprising:
    accessing at least one instance of two complex values from at least one first storage location;
    accessing at least one twiddle factor value from at least one second storage location, each at least one twiddle factor associated with a respective one of the stored at least one instance of two complex values;
    detecting an operation parameter that, when implemented, varies the behavior of a FFT instruction; and
    executing the FFT instruction according to said operation parameter using said at least one instance of two complex values and said at least one twiddle factor value and said operation parameter to transform the at least one instance of two complex values to at least two outputs corresponding to processed communication data, wherein initiation of execution of the FFT instruction occurs in a single processor cycle.

11. The method of claim 10, wherein said detecting further comprises:
    detecting a replication parameter that, when implemented, identifies a twiddle factor from said at least one twiddle factor value, wherein said fourth computer readable program code function applies the identified twiddle factor to execute the FFT instruction.

12. The method of claim 10, wherein said detecting further comprises:
    detecting a conjugation parameter, wherein said fourth computer readable program code function applies said conjugation parameter to perform an inverse FFT operation or a forward FFT operation.

13. The method of claim 10, wherein said detecting further comprises:
    detecting a scaling parameter, wherein said fourth computer readable program code function applies said scaling parameter to adjust a gain value to control overflow when executing the FFT instruction.

14. The method of claim 10, wherein said detecting further comprises:
    detecting an interleaving parameter, wherein said interleaving parameter is applied to reorder elements of an output from said two outputs.

15. The method of claim 10, wherein said detecting detects said operation parameter from at least one register having a control bit.

16. The method of claim 10, wherein said detecting detects said operation parameter from an opcode.

17. A system for executing an FFT instruction in a hardware processor to process communication data, comprising:
    a control register that includes one or more bits for specifying an operation parameter for varying the behavior of the FFT instruction;
    a processor that executes one or more instances of an FFT instruction;
    a first input register of the hardware processor that stores at least one instance of two complex values;
    a second input register of the hardware processor that stores at least one twiddle factor value;
    an execution unit to execute the FFT instruction to produce two outputs, wherein initiation of execution of the FFT instruction occurs in a single processor cycle; and
    an output register of the hardware processor that stores the two outputs corresponding to processed communication data.

18. The system of claim 17, wherein said operation parameter identifies a twiddle factor from said at least one twiddle factor value, wherein said execution unit applies the identified twiddle factor to execute the FFT instruction.

19. The system of claim 17, wherein said operation parameter instructs said execution unit to perform an inverse FFT butterfly operation or a forward FFT operation.

20. The system of claim 17, wherein said operation parameter instructs said execution unit to adjust a gain value to control overflow when executing the FFT instruction.

21. The system of claim 17, wherein said operation parameter is applied to reorder elements of an output from said two outputs.

22. A system for executing an FFT instruction in a hardware processor to process communication data, comprising:
    a control register that includes one or more bits for specifying an operation parameter for varying the behavior of the FFT instruction;
    a processor that executes one or more instances of the FFT instruction;
    a first storage comprising at least one instance of two complex values;
    a second storage comprising at least one twiddle factor value;
    an execution unit adapted to access said at least one instance of two complex values, said at least one twiddle factor value, and said operation parameter, and further adapted to execute the FFT instruction to produce two outputs corresponding to processed communication data, wherein initiation of execution of the FFT instruction occurs in a single processor cycle.

23. The system of claim 22, wherein said register is configured to hold a control bit that specifies said operation parameter.

24. The system of claim 22, wherein said register is configured to hold at least one opcode that specifies said operation parameter.

25. The system of claim 22, wherein said operation parameter includes at least one of a replication parameter, a conjugation parameter, a scaling parameter, and an interleaving parameter.

* * * * *

UNITED STATES PATENT AND TRADEMARK OFFICE
CERTIFICATE OF CORRECTION

PATENT NO. : 7,660,840 B2  Page 1 of 1
APPLICATION NO. : 10/952169
DATED : February 9, 2010
INVENTOR(S) : Mark Taunton It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 905 days.

Signed and Sealed this

Thirtieth Day of November, 2010

David J. Kappos
*Director of the United States Patent and Trademark Office*